US012589756B2

(12) United States Patent
Wulf et al.

(10) Patent No.: US 12,589,756 B2
(45) Date of Patent: Mar. 31, 2026

(54) ASYMMETRIC FAILSAFE SYSTEM ARCHITECTURE

(71) Applicant: ZF CV Systems Global GmbH, Bern (CH)

(72) Inventors: Oliver Wulf, Neustadt (DE); Andreas Goers, Pattensen (DE); Thomas Dieckmann, Pattensen (DE)

(73) Assignee: ZF CV Systems Global GmbH, Bern (CH)

( * ) Notice: Subject to any disclaimer, the term of this patent is extended or adjusted under 35 U.S.C. 154(b) by 315 days.

(21) Appl. No.: 17/877,569

(22) Filed: Jul. 29, 2022

(65) Prior Publication Data

US 2022/0363276 A1 Nov. 17, 2022

Related U.S. Application Data

(63) Continuation of application No. PCT/EP2020/052394, filed on Jan. 31, 2020.

(51) Int. Cl.
*B60W 50/029* (2012.01)
*B60W 10/18* (2012.01)
(Continued)

(52) U.S. Cl.
CPC .......... *B60W 50/029* (2013.01); *B60W 10/18* (2013.01); *B60W 30/12* (2013.01);
(Continued)

(58) Field of Classification Search
None
See application file for complete search history.

(56) References Cited

U.S. PATENT DOCUMENTS 9,604,585 B2 * 3/2017 Joyce .................. B60R 16/0232
10,809,719 B2 * 10/2020 Binet .................. G05D 1/0088
(Continued)

FOREIGN PATENT DOCUMENTS

CN 105358396 A 2/2016
CN 108475055 A 8/2018
(Continued)

OTHER PUBLICATIONS

International Search Report of the European Patent Office dated Oct. 20, 2020 for international application PCT/EP2020/052394 on which this application is based.
(Continued)

*Primary Examiner* — Vivek D Koppikar
*Assistant Examiner* — David Ruben Pedersen
(74) *Attorney, Agent, or Firm* — Walter Ottesen, P.A.

(57) ABSTRACT

The disclosure relates to a method for controlling a vehicle with an autonomous vehicle system which comprises an autonomous operating driving system which is configured to perform a dynamic driving task during fault-free operation of the autonomous operating driving system, and a redundancy driving system which is configured to carry out a reduced driving task. The autonomous operating driving system carries out trajectory planning and provides a planned trajectory for the reduced driving task to the redundancy driving system. If a fault of the operating driving system is detected, the redundancy driving system controls at least one vehicle actuator to perform the reduced driving task using the planned trajectory. Furthermore, the disclosure relates to an autonomous vehicle system and a vehicle with an autonomous vehicle system.

36 Claims, 10 Drawing Sheets

(51) Int. Cl.

| | |
|---|---|
| *B60W 30/12* | (2020.01) |
| *B60W 30/18* | (2012.01) |
| *B60W 50/02* | (2012.01) |
| *B60W 50/023* | (2012.01) |
| *B60W 60/00* | (2020.01) |

(52) U.S. Cl.
CPC .. *B60W 30/18163* (2013.01); *B60W 50/0205* (2013.01); *B60W 50/023* (2013.01); *B60W 60/0011* (2020.02); *B60W 60/00186* (2020.02); *B60W 2050/022* (2013.01); *B60W 2050/0292* (2013.01); *B60W 2050/0297* (2013.01); *B60W 2300/12* (2013.01); *B60W 2420/408* (2024.01)

(56) References Cited

U.S. PATENT DOCUMENTS

| | | | | |
|---|---|---|---|---|
| 11,345,359 | B2 * | 5/2022 | Zhu | G05D 1/0077 |
| 11,650,585 | B1 * | 5/2023 | Aschbacher | G07C 5/0816 |
| | | | | 701/29.2 |
| 2015/0012166 | A1 | 1/2015 | Hauler et al. | |
| 2016/0368491 | A1 | 12/2016 | Hauler et al. | |
| 2017/0090476 | A1 * | 3/2017 | Letwin | G05D 1/0212 |
| 2017/0199523 | A1 | 7/2017 | Barton-Sweeney et al. | |
| 2018/0229738 | A1 * | 8/2018 | Nilsson | B60T 7/12 |
| 2019/0079513 | A1 * | 3/2019 | Greenfield | B60W 50/029 |
| 2019/0118827 | A1 | 4/2019 | Khalifeh et al. | |
| 2019/0171205 | A1 | 6/2019 | Kudanowski | |
| 2019/0302763 | A1 | 10/2019 | Kondo et al. | |
| 2020/0201323 | A1 * | 6/2020 | Park | B60W 50/04 |
| 2020/0207374 | A1 * | 7/2020 | Li | G06F 11/3013 |
| 2021/0016785 | A1 | 1/2021 | Nakagawa | |
| 2021/0107520 | A1 | 4/2021 | Oltmann et al. | |
| 2021/0163021 | A1 * | 6/2021 | Frazzoli | B60W 50/023 |
| 2021/0171062 | A1 | 6/2021 | Hecker et al. | |
| 2021/0237752 | A1 * | 8/2021 | Ewert | G05D 1/0033 |
| 2022/0126880 | A1 * | 4/2022 | Kuemmel | B60W 40/105 |

FOREIGN PATENT DOCUMENTS

| | | |
|---|---|---|
| CN | 110304058 A | 10/2019 |
| DE | 10 2014 213 171 A1 | 10/2015 |
| DE | 10 2015 206 496 A1 | 10/2016 |
| DE | 10 2018 126 270 A1 | 4/2019 |
| DE | 10 2017 010 716 A1 | 5/2019 |
| DE | 10 2017 011 808 A1 | 6/2019 |
| WO | 2016/142030 A1 | 9/2016 |
| WO | 2019/055442 A1 | 3/2019 |
| WO | 2019/176301 A1 | 9/2019 |

OTHER PUBLICATIONS

Translation of Written Opinion of the International Searching Authority dated Oct. 20, 2020 for international application PCT/EP2020/052394 on which this application is based.

English translation and Office action of the Chinese Patent Office dated Mar. 7, 2025 in corresponding Chinese patent application 202080094405.X.

* cited by examiner

1

ASYMMETRIC FAILSAFE SYSTEM ARCHITECTURE

CROSS REFERENCE TO RELATED APPLICATION

This application is a continuation application of international patent application PCT/EP2020/052394, filed Jan. 31, 2020 designating the United States, and the entire content of the above application is incorporated herein by reference.

TECHNICAL FIELD

The disclosure relates to a method for controlling a vehicle, in particular a commercial vehicle, with an autonomous vehicle system which is configured to control the vehicle via multiple vehicle actuators, wherein the vehicle system has: An autonomous operating driving system configured to perform a dynamic driving task during fault-free operation of the autonomous operating driving system, wherein during fault-free operation the autonomous operating driving system controls at least one of the vehicle actuators to perform the dynamic driving task, and a redundancy driving system. Furthermore, the disclosure relates to an autonomous vehicle system.

BACKGROUND

Autonomous vehicle systems are configured to control one or more actuators of a vehicle in such a way that a driving task of the vehicle is carried out. Autonomous vehicle systems regulate the acceleration of vehicles partially or completely independently of a human user. In order to operate a vehicle without a driver, many different sensors for environment detection as well as large computing power for the evaluation of the sensor data streams are required. Based on sensor data, the autonomous vehicle system determines a trajectory for the driving task of the vehicle. While the vehicle follows the trajectory, the autonomous vehicle system monitors the environment and, if necessary, modifies the trajectory.

A common five-stage scheme for classifying the degree of automation of vehicles controlled by an autonomous vehicle system was developed by the Society of Automotive Engineers (SAE). Even in the event of a fault, the vehicle must be able to continue to operate safely until it can no longer pose a danger. In autonomy levels 3 to 5, the driving environment is monitored by the autonomous driving system, wherein in level 3 the human user takes over the vehicle control completely in the event of a fault in the autonomous driving system. Autonomy levels 4 and 5 provide for redundancy systems that at least partially perform the driving task in the event of a failure of an autonomous operating driving system. Such redundancy systems are necessary to avoid collisions with other vehicles, persons, or the vehicle environment in the event of a system failure and, where appropriate, to carry out safe braking of the vehicle to a standstill.

Although the redundancy system is only rarely or possibly never used in the course of a vehicle's lifetime, redundancy systems are in some cases configured as complete duplicates of the autonomous driving system including the highly complex sensors, resulting in high costs for the overall system. In order to avoid the high costs of a fully redundant system, various approaches are known. For example, from DE 10 2015 206 496 A1 a control device for a vehicle is known with a number of driver assistance systems and a monitoring device, wherein the driver assistance systems are configured to control the vehicle via a number of vehicle actuators. In one embodiment of the control device, an inspection device may also be provided, which is configured to monitor a computing device and/or the monitoring device for faults. If a fault is detected, the inspection device can issue a warning signal at least to the driver assistance systems and prevent the control signals from being limited by the monitoring device. In a further embodiment, the driver assistance systems may be configured to calculate a fail-safe trajectory for the safe braking of the vehicle to a standstill on receiving the warning signal and to control the vehicle actuators according to the calculated fail-safe trajectory. However, the system does not disclose any redundancy of the system in the event of a failure of the driver assistance systems and/or the associated sensors. Furthermore, the monitoring function is carried out permanently, which results in an increased energy demand.

US 2019/0118827 discloses a vehicle with a virtual vehicle driver system with multiple platform controls for vehicle actuators. A vehicle computer is programmed to receive recommendations from the platform controls for a minimum risk condition in the event of a fault and to select an event from the recommendations received which is executed as a result. In the event that one or more sensors fail, the minimum risk condition is carried out using the remaining sensors. Redundancy of the sensors themselves is not disclosed.

US 2019/0171205 A1 discloses a method for operating a vehicle control system which includes at least one downstream system with at least one actuator. The downstream system intercepts signals from a system located upstream and influences a movement of the vehicle by using the signals. The method includes the steps: transmitting signals from the upstream system to the downstream system in real time; determining that a fault has occurred upstream of the downstream system; and applying a response plan for the downstream system which contains a functional sequence of at least one actuator of the downstream system and which was previously stored in a memory accessible to the downstream system. Since the response plan is already saved in advance, the redundancy system cannot react to changed environmental conditions. Furthermore, the upstream system and the downstream system are arranged in a common circuit, wherein no redundancy is provided for a failure of the downstream system.

The disadvantage of the solutions mentioned is that sufficient redundancy is not provided. For example, the systems do not provide sufficient redundancy in the event of a failure of the highly complex sensors of the main system, the main computing unit and/or one or more actuators. As a result, safety cannot always be sufficiently guaranteed in the event of a failure of the main system.

SUMMARY

It is an object of the disclosure to provide methods for controlling a vehicle as well as autonomous vehicle systems which are cost-effective or use cost-effective components and ensure sufficient safety in the event of a failure of the autonomous operating driving system.

The present disclosure achieves the object in a first aspect in a method for controlling a vehicle with an autonomous vehicle system in that the redundancy driving system is configured to perform a reduced driving task, wherein the autonomous operating driving system is configured to carry out trajectory planning in order to carry out a planned trajectory for the reduced driving task and to provide it to the redundancy driving system, wherein the autonomous operating driving system and the redundancy driving system are interconnected and determine whether there is a fault in the respective other system, and wherein the redundancy driving system, after detecting a fault in the autonomous operating driving system, controls at least one of the vehicle actuators in order to carry out the reduced driving task while using the planned trajectory.

The disclosure takes advantage of the knowledge that a reduced driving task can be carried out with the help of a simplified redundancy driving system, which is significantly more cost-effective than the autonomous operating driving system. Both the autonomous operating driving system and the redundancy driving system are configured to control vehicle actuators. In the fault-free case, the autonomous operating driving system preferably performs the dynamic driving task completely independently of the redundancy driving system. The dynamic driving task generally includes steering, braking, and accelerating the vehicle, taking into account environmental conditions as well as determining intermediate points and waypoints. As part of the dynamic driving task, the autonomous operating driving system must at least react to other road users, signals and signs, environmental influences, and travel conditions. In some cases, the dynamic driving task may be autonomous driving of the vehicle on a public road from a first place to a second place, the second place being multiple kilometers from the first place. The reduced driving task has a reduced range of functions relative to the dynamic driving task.

The planned trajectory for the reduced driving task describes the planned movement path of the vehicle and is determined as part of trajectory planning. Preferably, the trajectory planning is carried out taking into account the condition of the vehicle, in particular the speed, the mass and the lateral acceleration, as well as other environmental conditions and environmental influences. Such environmental conditions and environmental influences can be, for example, ambient temperature, road temperature, road conditions, lane widths, lane profile and traffic volume. Since the planned trajectory for the reduced driving task is provided by the autonomous operating driving system to the redundancy driving system, the redundancy driving system does not have to carry out its own trajectory planning for the reduced driving task. This can increase the availability of the planned trajectory in the event of a fault. Preferably, the redundancy driving system is configured to perform a driving assistance function in a non-autonomous operating case. Particularly preferably, the redundancy driving system performs an emergency braking function, a lane keeping assistance function or a distance keeping assistance function in the non-autonomous operating case of the vehicle. Preferably, the redundancy driving system has a redundancy memory for storing the planned trajectory.

According to a first preferred embodiment, the redundancy driving system is configured to carry out reduced trajectory planning to obtain a reduced trajectory for the reduced driving task if no valid planned trajectory is provided by the autonomous operating driving system, wherein the redundancy driving system, after detecting a fault of the autonomous operating driving system, controls at least one of the vehicle actuators to perform the reduced driving task using the reduced trajectory. In the case of particularly serious faults, the autonomous operating driving system cannot perform trajectory planning and cannot provide a planned trajectory for the redundancy driving system. Furthermore, the planned trajectory may be invalid, for example due to a transmission error or the expiration of a time stamp.

In order to still be able to carry out the reduced driving task, the redundancy driving system can perform reduced trajectory planning, the range of functions of which is limited compared to the trajectory planning. For example, in reduced trajectory planning, a reduced parameter set compared to trajectory planning can be used. Furthermore, reduced trajectory planning compared to trajectory planning can be carried out on the basis of qualitatively and/or quantitatively reduced data. Furthermore, the reduced trajectory may be limited compared to the planned trajectory. For example, the maximum length of the reduced trajectory may be reduced compared to the planned trajectory. Furthermore, a maximum length of the trajectory and/or a maximum duration of time required by a vehicle to travel the trajectory is preferably limited.

Preferably, the redundancy driving system is configured to determine whether a planned trajectory provided by the autonomous operating driving system is suitable for performing the reduced driving task. Furthermore, the redundancy driving system is preferably configured to carry out the reduced trajectory planning in order to obtain a reduced trajectory for the reduced driving task.

Preferably, the autonomous operating driving system performs the trajectory planning cyclically to obtain a planned trajectory and provides the planned trajectory to the redundancy driving system. The redundancy driving system uses the last planned trajectory provided to perform the reduced driving task. By carrying out the trajectory planning cyclically, the planned trajectory can be adapted to changed operating conditions of the vehicle or the vehicle environment. This is advantageous, for example, if, after carrying out trajectory planning, another vehicle changes a driving style and thus blocks the planned trajectory. Particularly preferably, a cycle time between two successive trajectory plans has a range of 1 ms to 10 seconds, preferably 1 ms to 1 second, preferably 1 ms to 500 ms, more preferably 1 ms to 20 ms, especially preferably about 10 ms.

The shorter the cycle time between two consecutive trajectory plannings, the lower the probability that the planned trajectory will be unsafe for the reduced driving task due to changed conditions. In general, however, with a decreasing cycle time, the energy requirement of the autonomous operating driving system increases.

In a further preferred embodiment, the autonomous operating driving system has one or more primary sensors that provide sensor data to a central control unit of the autonomous operating driving system, wherein the central control unit performs the trajectory planning using the sensor data. Preferably, the primary sensors comprise highly complex sensors, such as at least one 3D lidar scanner, an imaging radar, a stereo camera, a mono camera, a receiver for V2X data, a receiver for GPS information, a means of environment fusion of imaging sensors, an accelerometer, a yaw rate sensor, a wheel speed sensor and/or a steering wheel angle sensor.

The central control unit is configured to evaluate the sensor data and to generate therefrom information about a vehicle condition and/or the vehicle environment. For example, the central control unit can use the sensor data to determine the profile of a lane in which the vehicle is located. The primary sensors allow a particularly precise determination of the vehicle condition and/or the vehicle environment. By using the sensor data for the trajectory planning, high accuracy and/or safety of the planned trajectory can be ensured.

According to a further preferred embodiment, the redundancy driving system has one or more simple redundancy sensors which provide redundancy sensor data to a central redundancy control unit, wherein the central redundancy control unit uses the redundancy sensor data to determine whether there is an obstacle on the planned trajectory or the reduced trajectory and modifies the planned trajectory or reduced trajectory using the redundancy sensor data when an obstacle is detected on the planned trajectory or the reduced trajectory. Compared to the particularly highly complex primary sensors, the redundancy sensors are preferably simple and cost-effective sensors, wherein the quality of the redundancy sensor data provided by the redundancy sensors is lower compared to the sensor data. For example, the resolution of the vehicle environment may be restricted.

Preferably, the redundancy sensors have a radar and/or a camera. Particularly preferably, the redundancy sensors are sensors which are used in common driver assistance systems, such as a lane keeping assistance system or an emergency braking assistance system. Sensors of common assistance systems are widely used and are therefore comparatively inexpensive. Preferably, the functional scope of the central redundancy control unit is limited compared to the central control unit. For example, a computing power and/or a memory capacity of a memory may be lower. This makes it possible to save financial resources in the context of the initial equipment as well as a reduced energy requirement. Since the redundancy driving system has its own redundancy sensors, it is possible to safely carry out the reduced driving task even if there is a fault in the highly complex primary sensors. Furthermore, in the event of a complete failure of the operating driving system, the redundancy driving system can ensure safe operation of the reduced task even if an obstacle appears along the planned trajectory and/or the reduced trajectory after trajectory planning or reduced trajectory planning. For example, a planned trajectory for moderate braking of the vehicle can be modified to the trajectory of emergency braking of the vehicle if the central redundancy control unit determines that there is an obstacle on the planned trajectory using the redundancy sensor data.

According to a preferred embodiment, the redundancy driving system is supplied by a redundancy power supply independent of the operating driving system. Such a configuration can exclude a further potential source of error that endangers the safe operation of the autonomous vehicle system. Even if there is a fault in the autonomous operating driving system due to a failure of a main power supply, the redundancy driving system can be supplied with power by the redundancy power supply and can perform the reduced driving task. Preferably, the redundancy power supply has a lower capacity than a main power supply. As a result, the cost of the redundancy power supply can be reduced compared to the cost of the main power supply. Due to the lower range of functions of the redundancy driving system, the energy consumption thereof is reduced compared to the autonomous operating driving system, so that the supply of power is also possible with a redundancy power supply with lower capacity.

Preferably, the redundancy sensors also provide the redundancy sensor data to the central control unit. Thus, it can be achieved that the central control unit can also use the redundancy sensor data when carrying out trajectory planning. Thus, preferably, the quality of the trajectory planning and the planned trajectory obtained from it can be further improved. Preferably, the central control unit is configured to verify at least some of the sensor data of the primary sensors via the redundancy sensor data.

Preferably, the reduced driving task is a controlled braking maneuver in which the redundancy driving system prevents the wheels of one axle of the vehicle from locking. Locking of the wheels of the vehicle may lead to an uncontrolled movement of the vehicle, so that the planned trajectory or the reduced trajectory may not be adhered to. In addition, the braking distance of the vehicle is extended when the wheels lock. Preferably, the planned trajectory and/or the reduced trajectory for the controlled braking maneuver is configured in such a way that the vehicle is decelerated with moderate acceleration values and thus an available braking distance is exploited. Moderate values of acceleration can prevent the vehicle or a trailer from breaking away, vehicles behind from driving into the vehicle and/or damage to vehicle loads. However, it should be understood that the controlled braking maneuver may also be an emergency braking of the vehicle. This is the case, for example, if there is not sufficient braking distance available for moderate braking. The controlled braking maneuver allows the vehicle to brake safely to a standstill. In the event of a failure of the autonomous operating driving system, the redundancy driving system brings the vehicle to a safe standstill, wherein collisions with other vehicles and/or obstacles in the vehicle environment are avoided by the redundancy driving system.

Preferably, the controlled braking maneuver is a lane-keeping braking maneuver in which the vehicle remains in a lane, and/or a lane change braking maneuver in which the vehicle is steered and decelerated to an existing passable alternative lane, preferably a shoulder, wherein the central redundancy control unit monitors compliance with the planned trajectory or reduced trajectory using the redundancy sensor data. In a lane-keeping braking maneuver, also known as a stop-in-lane braking maneuver, the planned trajectory and/or reduced trajectory runs along a lane in which the vehicle is located. It should be understood that the lane can also be curved or have a curve. Preferably, the lane-keeping braking maneuver is carried out if there is no passable alternative lane. This is the case, for example, if the vehicle is driving on a single-lane road or if a shoulder is blocked by a defective vehicle. The planned trajectory and/or reduced trajectory for a lane change braking maneuver runs from a first lane on which the vehicle is located to another lane that is passable. It should be understood that the planned trajectory and/or the reduced trajectory for the lane change braking maneuver can also run over more than two lanes. The central redundancy control unit is preferably configured to modify the planned trajectory or reduced trajectory using the redundancy sensor data. Preferably, the lane change braking maneuver, which is also referred to as a stop-on-hard-shoulder braking maneuver, is performed. Particularly preferably, the redundancy driving system is configured to determine whether a lane change braking maneuver is possible. Preferably, the redundancy control unit is configured to determine, using the redundancy sensor data, whether there is an obstacle in the lane in which the vehicle is located or in the alternative lane.

In a preferred embodiment, if there is no fault the central control unit performs operational trajectory planning to obtain an operational trajectory and provides the operational trajectory to an operational controller and a redundancy controller, wherein the operational controller and/or redundancy controller actuates at least one of the vehicle actuators in order to keep the vehicle on the pre-planned operational trajectory. Here, the planning of the operational trajectory is carried out by the central unit of the autonomous operating driving system, wherein the operational controller controls the vehicle actuators using the operational trajectory provided by the central control unit in such a way that the vehicle is held on the pre-planned operational trajectory. Preferably, the autonomous operating driving system is of a modular configuration, wherein the central control unit carries out the planning and the operational controller carries out the planned driving task. The redundancy controller represents a redundancy level for the operational controller. In the event of a fault of the operational controller, the planned operational trajectory is provided by the central control unit to the redundancy controller, so that at least some of the vehicle actuators can still be controlled. Preferably, the operational controller and/or the redundancy controller is configured to determine whether there is a fault of a vehicle actuator. Particularly preferably, the operational controller and/or the redundancy controller is configured to provide a determined fault of a vehicle actuator to the central control unit and/or the redundancy control unit.

Furthermore, it is preferred that the vehicle actuators include at least one vehicle actuator from the group: transmission, motor, main braking system, redundancy braking system or steering actuator. Preferably, the transmission is an automatic transmission. The main braking system and/or the redundancy system is preferably in the form of a pneumatic braking system. Furthermore, the main braking system and/or the redundancy braking system is an electronic braking system. Furthermore, preferably, the main braking system and/or the redundancy braking system regulates a brake pressure of brake cylinders of the wheels individually.

According to a further preferred embodiment, the central redundancy control unit provides the planned trajectory or the reduced trajectory of the reduced driving task to the operational controller and the redundancy controller, wherein the operational controller and/or the redundancy controller controls at least one of the vehicle actuators in order to keep the vehicle on the trajectory of the reduced driving task if there is no operational trajectory in the event of a fault in the operating driving system. The trajectory of the reduced driving task can be the planned trajectory or the reduced trajectory. Preferably, the operational controller and the redundancy controller are configured to accept the planned trajectory or the reduced trajectory of the reduced driving task only if no operational trajectory is provided by the central control unit of the autonomous operating driving system. Preferably, the central control unit is connected to the operational controller and the redundancy controller and the central redundancy control unit is also connected to the operational controller and the redundancy controller. Thus, safe operation of the vehicle can be ensured even if, for example, the central control unit and the redundancy controller fail at the same time. As a result, the safety of the system can be advantageously improved. Furthermore, safe operation of the vehicle is ensured even if the autonomous operating driving system or the redundancy driving system fails completely.

Preferably, the operational controller monitors a fault status of the redundancy controller and the redundancy controller monitors a fault status of the operational controller. Particularly preferably, the operational controller and the redundancy controller are configured to provide a fault status of the respective other component to the central control unit and/or the redundancy control unit if there is a fault of the respective other component. Preferably, the central control unit performs the trajectory planning and/or the operational trajectory planning using the fault status of the operational controller and/or the redundancy controller.

Likewise, the central redundancy control unit preferably performs the reduced trajectory planning using the error status of the operational controller and/or the redundancy controller. With such a configuration, it is possible to take into account during operational trajectory planning, trajectory planning and/or reduced trajectory planning if one or more vehicle actuators cannot be controlled due to a fault of the operational controller and/or the redundancy controller.

In a preferred embodiment, in the event that a main braking system of the operating driving system fails, the vehicle is braked via a redundancy braking system independent of a main power supply of the operating driving system. However, it can be advantageously achieved that even in the event of failure of the main system, the vehicle can be safely braked to a standstill. The control of the redundancy braking system can be carried out both by the operational controller and by the redundancy controller. However, it should be understood that the main braking system can be supplied by the redundancy power supply and the redundancy braking system can be supplied by the main power supply.

According to a further preferred embodiment, steering of the vehicle is carried out via a steering actuator, which is controlled by the redundancy controller and is independent of a main power supply of the operating driving system. Thus, steering of the vehicle is also possible in the event that the main power supply of the operating driving system fails. Particularly preferably, the main braking system and the steering actuator are supplied by different power supplies. It should be understood that the steering actuator is controlled by the redundancy controller or the operational controller during fault-free operation using the operational trajectory provided by the central control unit.

Preferably, in the event that a steering actuator of the operating driving system fails, emergency steering of the vehicle is carried out via a main braking system, wherein the main braking system is preferably controlled by the redundancy controller. Equally preferably, the main braking system can also be controlled by the operational controller. Preferably, the main braking system is supplied by the main power supply. However, it may also be provided that the main braking system is independent of the main power supply and is supplied via the redundancy power supply. Preferably, the emergency steering is carried out by selective braking of individual wheels, preferably individual front wheels, of the vehicle. If, for example, the left front wheel of a commercial vehicle is braked, a left-hand rotation of the steering wheel of the commercial vehicle can be achieved due to the special axle kinematics of commercial vehicles. The emergency steering allows the vehicle to be held in a lane even in the event of a fault in the steering actuator, the autonomous operating driving system and/or the power supply connected to the steering actuator. Preferably, the emergency steering also allows a lane change of the vehicle.

According to a second aspect, the disclosure achieves the object set at the outset with an autonomous vehicle system for controlling a vehicle, in particular a commercial vehicle, having: An autonomous operating driving system, which is configured to control at least one vehicle actuator of the vehicle for performing a dynamic driving task during fault-free operation of the autonomous operating driving system, a redundancy driving system, which is configured to perform a reduced driving task, wherein the autonomous operating driving system is configured to perform trajectory planning to obtain a planned trajectory for the reduced driving task and to provide the planned trajectory to the redundancy driving system, wherein the autonomous operating driving system and the redundancy driving system are interconnected and configured to determine whether there is a fault of the respective other system, wherein the redundancy driving system is configured for controlling at least one vehicle actuator for carrying out the reduced driving task using the planned trajectory on determining a fault of the autonomous operating driving system.

During fault-free operation, the driving task is undertaken by the autonomous operating driving system, while the redundancy driving system is provided as a fallback level in the event of a fault of the autonomous operating driving system. However, it should be understood that for performing the autonomous driving task the autonomous operating driving system can preferably also control one or more subcomponents of the redundancy driving system and/or can provide an operational trajectory to subcomponents of the redundancy driving system. Preferably, the autonomous operating driving system controls a larger number of vehicle actuators than the redundancy driving system.

According to a first preferred embodiment, the redundancy driving system is configured to carry out reduced trajectory planning to obtain a reduced trajectory for the reduced driving task if no valid planned trajectory is provided by the autonomous operating driving system, and wherein the redundancy driving system is configured for controlling at least one vehicle actuator for carrying out the reduced driving task using the reduced trajectory on detecting a fault of the autonomous operating driving system.

According to a preferred embodiment, the operating driving system has one or more primary sensors for determining sensor data, a central control unit connected to the sensors and a main power supply for the operating driving system, wherein the central control unit is configured to carry out trajectory planning to obtain a planned trajectory using the sensor data, if there is no fault. Preferably, there is no redundancy for the primary sensors, whereby procurement costs and/or manufacturing costs of the autonomous vehicle system can be reduced.

Preferably, the operating driving system further has an operational controller connected to the central control unit, which is configured for controlling at least one vehicle actuator and/or a first group of vehicle actuators of the vehicle system. The central control unit preferentially performs trajectory planning and operational trajectory planning and provides the planned trajectory and operational trajectory to the operational controller. The operational controller controls at least one vehicle actuator and/or the first group of vehicle actuators so that the vehicle follows the planned trajectory or the operational trajectory. Preferably, the autonomous vehicle system has multiple groups of vehicle actuators.

Preferably, a first group of vehicle actuators comprises a transmission, a motor and/or a main braking system, wherein the vehicle actuator or the vehicle actuators is/are connected to the main power supply of the operating driving system. It should be understood that the first group of vehicle actuators can also have only one or two of the vehicle actuators mentioned. Preferably, in any case, a main braking system is provided. Preferably, the first group of vehicle actuators is assigned those vehicle actuators that influence a longitudinal acceleration of the vehicle. However, it may also be provided that the first group of vehicle actuators is also or exclusively assigned to one or more vehicle actuators that influence lateral acceleration of the vehicle. It should be understood that a vehicle actuator can influence both the longitudinal acceleration and the lateral acceleration of the vehicle. For example, this is the case if the wheels of the vehicle are braked asymmetrically.

Alternatively, the first group of vehicle actuators may include a steering actuator and/or a redundancy braking system, wherein the vehicle actuator(s) are connected to the main power supply of the operating driving system. The alternatives mentioned differ in which vehicle actuators are controlled by the operational controller.

Preferably, the redundancy driving system has one or more simple redundancy sensors for determining redundancy sensor data connected to the central control unit of the operating driving system and to a central redundancy control unit of the redundancy driving system. Preferably, the use of the redundancy sensor data is therefore possible in the context of operational trajectory planning, reduced trajectory planning, trajectory planning and/or monitoring of the driving task or the reduced driving task. During fault-free operation, the central control unit of the operating driving system carries out the operational trajectory planning preferably using the sensor data of the primary sensors and the redundancy sensor data of the redundancy sensors. In the event of a fault in the autonomous operating driving system, the redundancy control unit can perform reduced trajectory planning for the reduced driving task and/or can monitor the reduced driving task along the planned trajectory or the reduced trajectory using the redundancy sensor data. The redundancy sensors thus form a redundancy level for the primary sensors. The redundancy sensors have a reduced range of functions compared to the primary sensors and are more cost-effective. For example, a data acquisition frequency, a resolution, an accuracy, or a measuring principle of the redundancy sensors can be simpler than corresponding comparative values of the primary sensors. Further preferably, a total number of the primary sensors is greater than a number of the redundancy sensors.

According to a preferred embodiment, the redundancy driving system further has a redundancy power supply for supplying the redundancy driving system and a redundancy controller which is configured to control a vehicle actuator and/or a second group of vehicle actuators of the vehicle system. Preferably, the central control unit of the operating driving system also provides the operational trajectory to the redundancy controller. Thus, the redundancy controller can be provided in the context of the autonomous driving task for controlling the second group of vehicle actuators. Preferably, the redundancy controller is configured to control the second group of vehicle actuators using the planned trajectory of the reduced driving task only if no operational trajectory of the autonomous driving task is provided by the central control unit. The second group of vehicle actuators is therefore also controlled to perform the autonomous driving task during fault-free operation. If no operational trajectory is provided by the central control unit due to a fault in the operating driving system, the redundancy controller controls the second group of vehicle actuators according to the reduced driving task.

Preferably, the second group of vehicle actuators includes a steering actuator and/or a redundancy braking system, which are connected to the redundancy power supply of the redundancy driving system. Alternatively, the second group of vehicle actuators may include a transmission and/or a motor and/or a main braking system, wherein the vehicle actuator(s) are connected to the redundancy power supply of the redundancy driving system. In any case, a main braking system is preferably provided. Preferably, the steering actuator and the main braking system of the autonomous driving system are assigned to different groups of vehicle actuators, which are supplied by different power supplies of the autonomous vehicle system. Thus, it can be ensured that in the event of a fault in the main power supply or the redundancy power supply, steering the vehicle via the steering actuator or emergency steering of the vehicle via the main braking system is still possible. Further preferably, the main braking system and the redundancy braking system are assigned to different groups of vehicle actuators, which are supplied by different power supplies of the autonomous vehicle system. Thus, in the event of a fault in the main power supply or the redundancy power supply, braking of the vehicle can be ensured via the redundancy braking system or the main braking system. It should be understood that other assignments of vehicle actuators to the groups of vehicle actuators are also preferred.

In a preferred embodiment, the redundancy sensors comprise a vehicle side sensor, in particular a side radar, a side ultrasound and/or a side lidar sensor, which is configured to determine a distance to a lateral road boundary.

Furthermore, the vehicle side sensor may also be configured to determine whether there is an obstruction in a side area of the vehicle. Particularly preferably, the vehicle sensor is configured to monitor a blind spot of a vehicle. The vehicle side sensor enables and/or improves the monitoring of the vehicle's lane keeping capacity when it is performing the reduced driving task using the planned trajectory and/or the reduced trajectory. Further, the trajectory planning, the operational trajectory planning and/or the reduced trajectory planning is preferably carried out using side sensor data of the vehicle side sensor. It should be understood that the primary sensors may preferably include one or more primary side sensors.

Preferably, the redundancy sensors comprise a short-range front sensor and/or a wide angle lidar sensor, which are configured to determine a passable space up to the vehicle edges. The passable space is the area around the vehicle that can be safely navigated by the vehicle. The detection up to the vehicle edges, for example the front, rear and/or side surfaces, of the vehicle ensures that even obstructions in close proximity to the vehicle are detected. It should be understood that the primary sensors are preferably configured to determine a passable space up to the vehicle edges.

According to a preferred embodiment, the operational controller is configured to determine a fault status of the first group of vehicle actuators and to provide it to the central control unit. Preferably, the central control unit is configured to determine, using the fault status of the first group of vehicle actuators, whether there is a fault of one or more of the vehicle actuators of the first group, and particularly preferably to determine which of the vehicle actuators has a fault. Preferably, the central control unit is further configured to carry out the trajectory planning and/or the operational trajectory planning using the determined fault status of the first group of vehicle actuators.

Further preferably, the redundancy controller is configured to determine a fault status of the second group of vehicle actuators and to provide it to the central redundancy control unit and/or to the central control unit. The central control unit and/or the redundancy control unit are preferably configured to determine, using the fault status of the second group of vehicle actuators, whether there is a fault of one or more of the vehicle actuators of the second group, and particularly preferably to determine which of the vehicle actuators has a fault. Preferably, the central control unit is configured to carry out the trajectory planning and/or the operational trajectory planning using the determined fault status of the second group of vehicle actuators. Likewise, the redundancy control unit may also be configured to carry out the reduced trajectory planning using the fault status of the second group of vehicle actuators.

In a third aspect of the disclosure, the aforementioned object is achieved by a vehicle, in particular a commercial vehicle, having a vehicle system according to one of the preferred embodiments of an autonomous vehicle system described above according to the second aspect of the disclosure, which is used to carry out a method according to one of the preferred embodiments of the method described above according to the first aspect of the disclosure. It is to be understood that the method for controlling a vehicle according to the first aspect of the disclosure, the autonomous vehicle system according to the second aspect of the disclosure and the vehicle according to the third aspect of the disclosure have the same or similar sub-aspects as they are laid down in particular in the dependent claims. In this respect, full reference is made to the above description for these aspects.

BRIEF DESCRIPTION OF THE DRAWINGS

The invention will now be described with reference to the drawings wherein.

DESCRIPTION OF THE PREFERRED EMBODIMENTS

Figure 1:
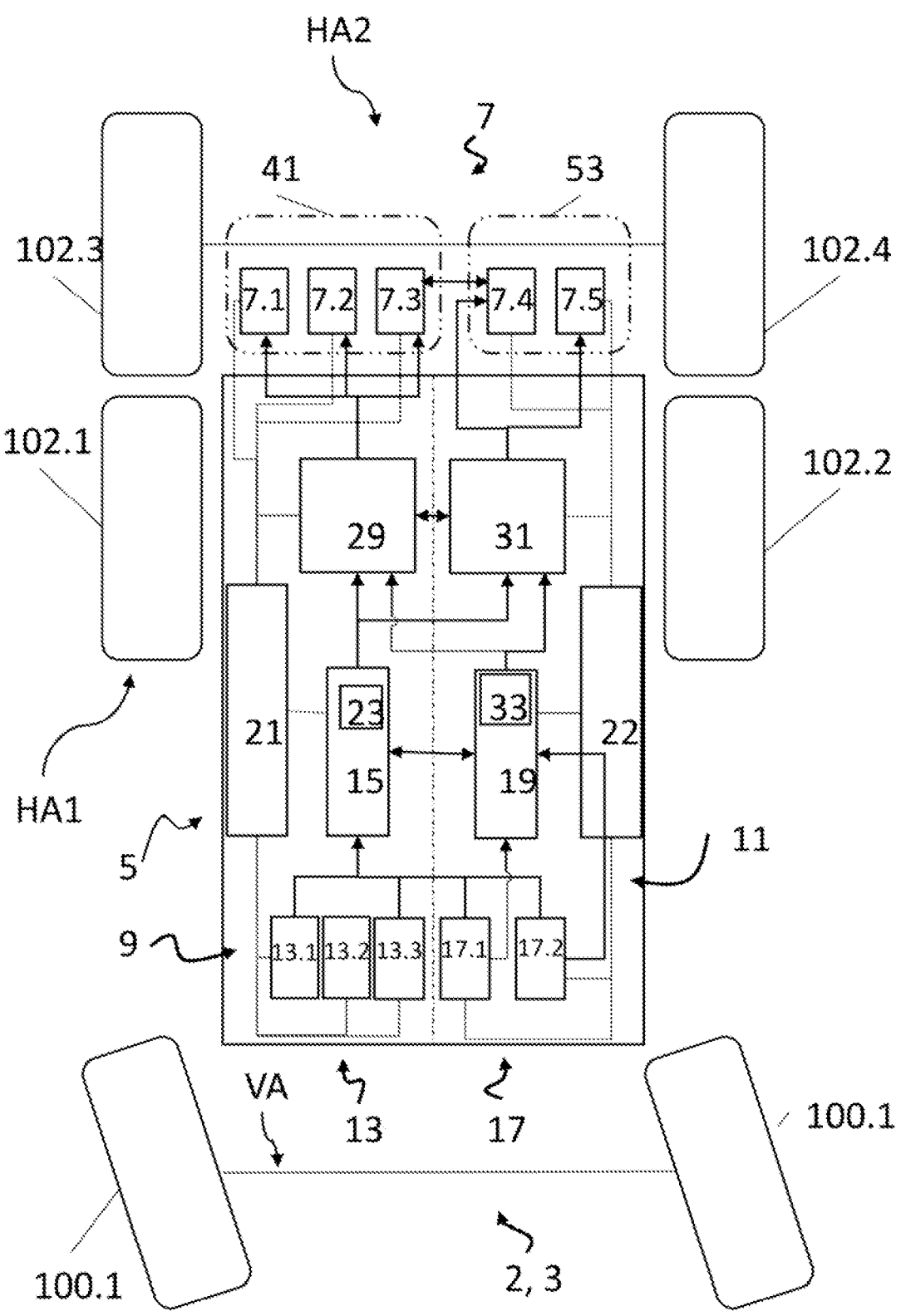
FIG. 1 shows a schematic representation of a vehicle with an autonomous vehicle system according to a first embodiment.
Figure 2:
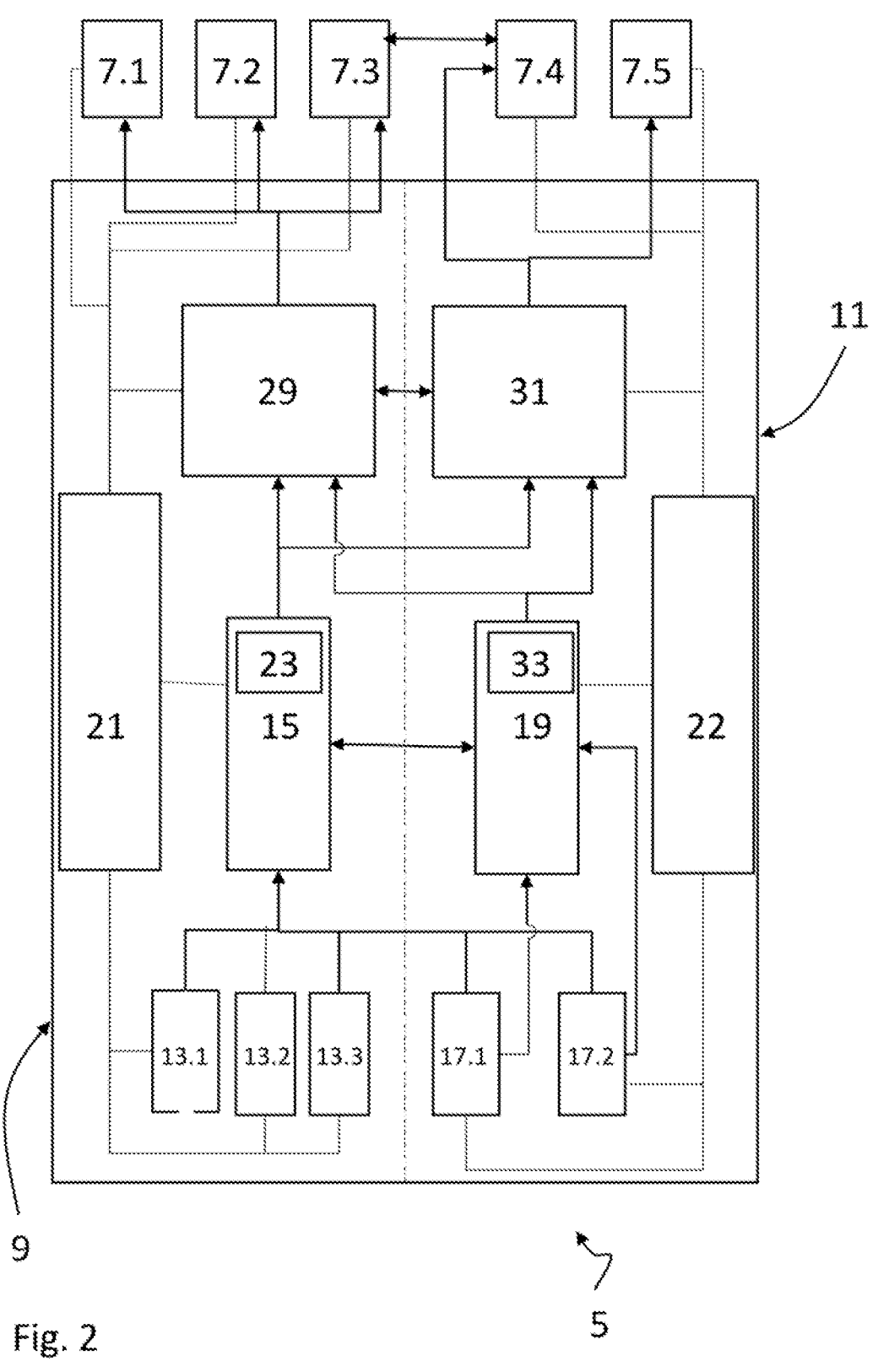
FIG. 2 shows a schematic representation of the autonomous vehicle system according to the first embodiment.
Figure 5:
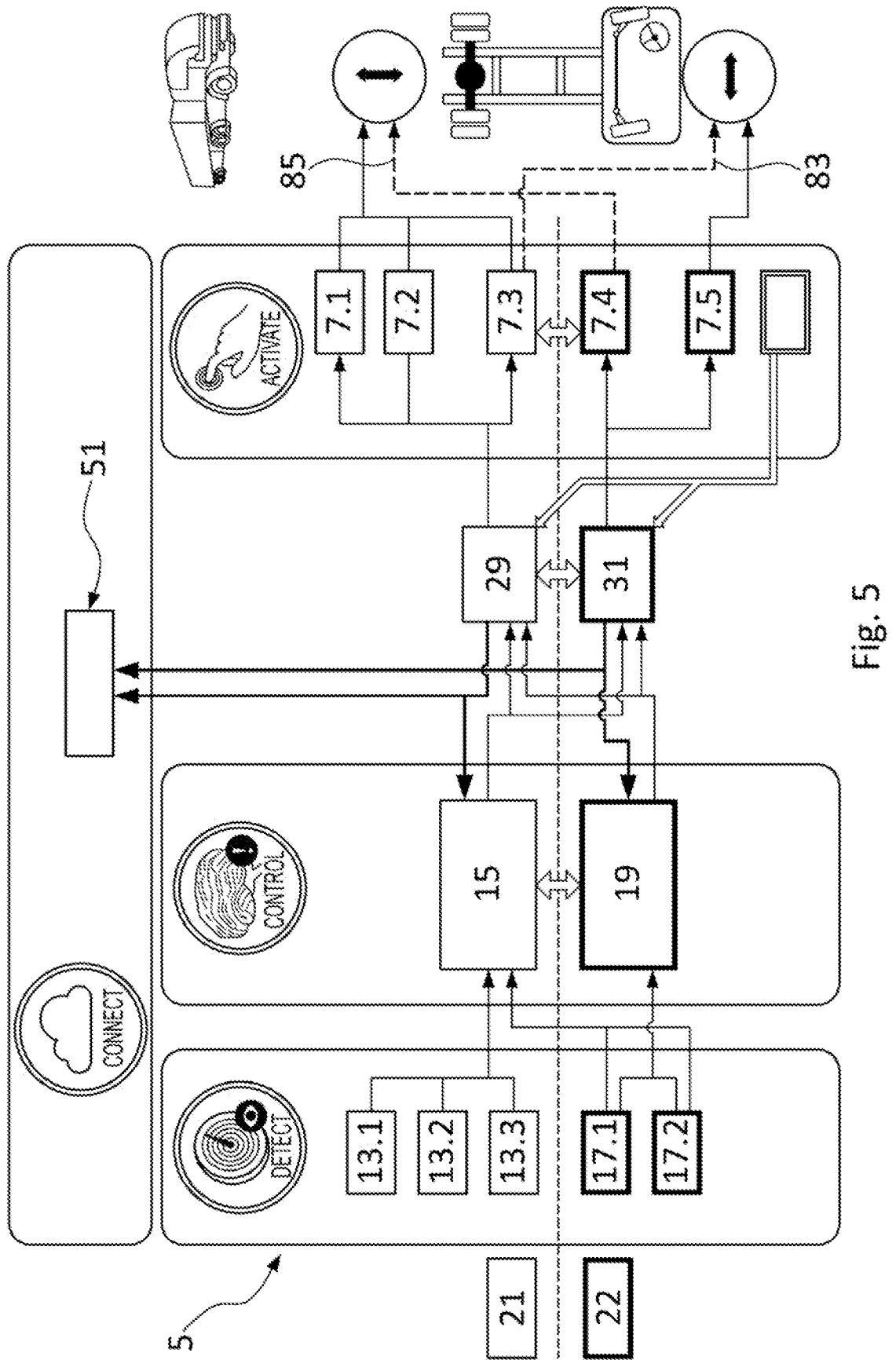
FIG. 5 shows a schematic representation of an autonomous vehicle system according to a third embodiment.

A vehicle 2, in particular a commercial vehicle 3, has an autonomous vehicle system 5 with an operating driving system 9 and a redundancy driving system 11 (see FIGS. 1, 2 and 5). The vehicle 2 is shown here as a commercial vehicle 3 with a first rear axle HA1, a second rear axle HA2 and a front axle VA. The front wheels 100.1, 100.2 of the front axle VA are steerable. The rear wheels 102.1, 102.2, 102.3, 102.4 of the first rear axle HA1 and the second rear axle HA2 are in the form of non-steerable wheels here. However, it may also be provided that the rear wheels 102.1, 102.2 of the first rear axle HA1 and/or the rear wheels 102.3, 102.4 of the second rear axle HA2 are steerable. For this purpose, first and second rear axle steering actuators may be provided (not shown).

As illustrated by the arrows shown in FIG. 1, primary sensors 13 of the autonomous operating driving system 9 provide sensor data SD to a central control unit 15 of the operating driving system 9. Furthermore, redundancy sensors 17 also provide redundancy sensor data SDR to the central control unit 15. In addition, the redundancy sensors 17 also provide the redundancy sensor data SDR to a central redundancy control unit 19. The sensor data and/or the redundancy sensor data SDR can represent information about a vehicle condition and/or the vehicle environment.

Preferably, a number of the individual primary sensors 13.1, 13.2, 13.3 is greater than a number of the individual redundancy sensors 17.1, 17.2. The primary sensors 13 have a greater range of functions compared to the redundancy sensors 17 and can be described as highly complex sensors. Preferably, an amount of data of the primary sensor data SD is greater than an amount of data of the redundancy sensor data SDR. Furthermore, a frequency of providing the primary sensor data SD to the central control unit 15 may be greater than a frequency of providing the redundancy sensor data SDR to the central control unit 15 and to the redundancy control unit 19. Since the redundancy sensor data SDR are provided both to the central control unit 15 of the operating driving system 9 and to the central redundancy control unit 19, an amount of data provided to the central control unit 15 is greater than an amount of data provided to the redundancy control unit 19. Therefore, the redundancy control unit 19 of the redundancy driving system 11 can be configured with a smaller range of functions than the central control unit 15 of the operating driving system 9. For example, the redundancy control unit 19 may have a lower computing power or a limited scope of executable operations compared to the central control unit 15. Here, a first primary sensor 13.1 is implemented as a 3D lidar scanner, a second primary sensor 13.2 as a stereo camera and a third primary sensor 13.3 as an imaging radar. The primary sensors 13 shown in FIG. 1 are configured here as sensors that are configured to collect data about a vehicle environment 24. Furthermore, the primary sensors 13 can also collect information about a vehicle condition, such as a vehicle speed. A first redundancy sensor 17.1 may be in the form of a radar here, while a second redundancy sensor 17.2 is a mono camera.

Figure 3:
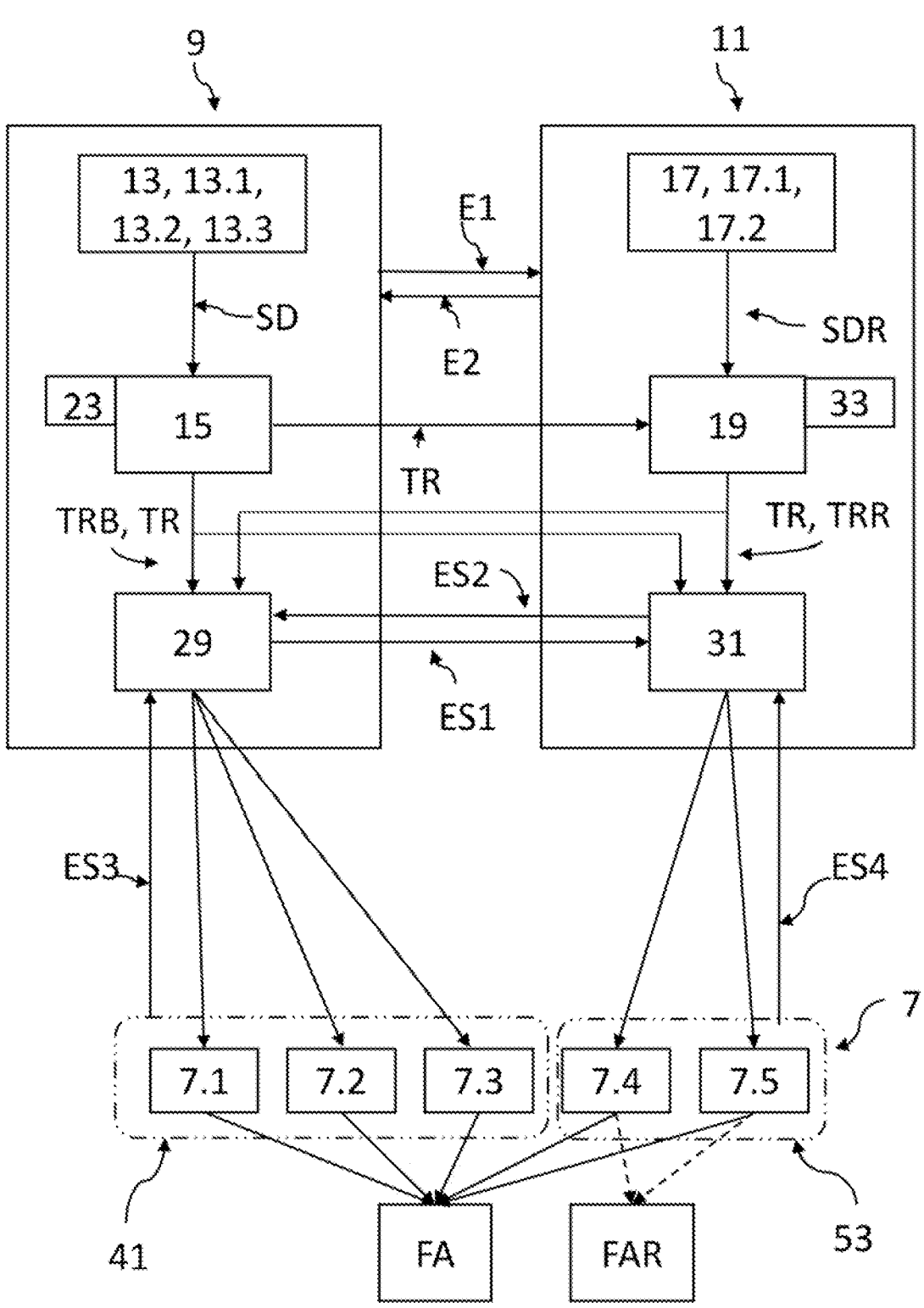
FIG. 3 shows a schematic representation of the autonomous vehicle system according to the first embodiment, which illustrates a provision of control commands, trajectories, and fault information.
Figure 4:
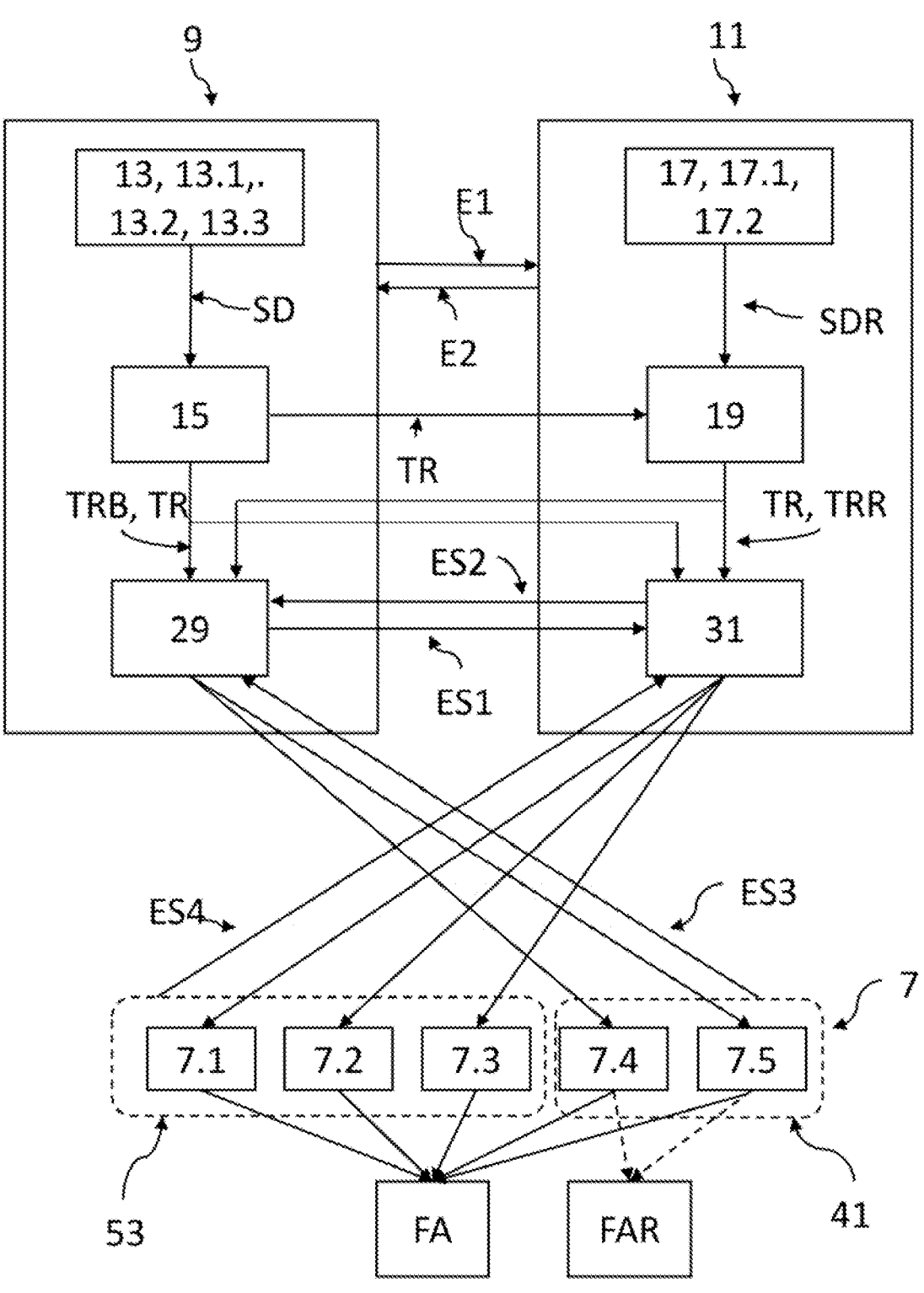
FIG. 4 shows a schematic representation of the autonomous vehicle system according to a second embodiment, which illustrates a provision of control commands, trajectories, and fault information.

As illustrated by the double arrow arranged in FIG. 1 between the central control unit 15 and the redundancy control unit 19, the central control unit 15 is configured to determine whether there is a fault E2 (see FIGS. 3, 4) of the redundancy control unit 19. In an analogous manner, the redundancy control unit 19 is configured to determine whether there is a fault E1 of the central control unit 15. It should be understood that the determination of a fault E1, E2 can also be based on a lack of a signal and/or based on a time out signal of the central control unit 15 and/or the redundancy control unit 19. Furthermore, the central control unit 15 and/or the redundancy control unit 19 may be configured to directly output a fault signal E1, E2.

The central control unit 15 is configured here to carry out operational trajectory planning in order to obtain an operational trajectory TRB for an autonomous driving task FA. Operational trajectory planning is carried out using the sensor data SD provided by the primary sensors 13 and/or the redundancy sensor data SDR provided by the redundancy sensors 17. Furthermore, the central control unit 15 is configured to carry out trajectory planning for a reduced driving task FAR in order to obtain a reduced trajectory TRR. The reduced driving task FAR is preferably carried out if there is a fault E1 of the autonomous operating driving system 9, so that the autonomous driving task FA cannot be carried out by the operating driving system 9. Preferably, the central control unit 15 carries out the operational trajectory planning cyclically, preferably with a frequency in a range of 0.1 to 1000 Hz, further preferably 1 to 1000 Hz, more preferably 2 to 1000 Hz, more preferably 10 to 1000 Hz, more preferably 50 to 1000 Hz, particularly preferably 100 Hz. Particularly preferably, a cycle time ZT of the trajectory planning corresponds to a cycle time ZTB of the operational trajectory planning. However, it may also be provided that a cycle time ZT of the trajectory planning is greater than the cycle time ZTB of the operational trajectory planning. This may be particularly desirable to reduce energy consumption, a storage requirement of a memory 23 of the central control unit 15 and/or the computing power of the central control unit 15. The trajectory TR for the reduced driving task is provided to the redundancy control unit 19. If no trajectory TR is provided to the redundancy control unit 19 due to a fault of the central control unit 15, the redundancy control unit 19 can perform reduced trajectory planning to obtain a reduced trajectory TRR. It should be understood that the redundancy control unit 19 can also carry out the reduced trajectory planning cyclically. Preferably, a cycle time ZTR of the reduced trajectory planning, measured between the provision of two successive reduced trajectories TRR, has a range of 0.1 to 1000 Hz, more preferably 1 to 1000 Hz, more preferably 2 to 1000 Hz, more preferably 10 to 1000 Hz, more preferably 50 to 1000 Hz, more preferably 100 Hz, particularly preferably 100 Hz. Further, it may also be preferably provided that the reduced trajectory planning is carried out only if the redundancy control unit 19 determines that there is a fault E1 of the central control unit 15.

A fault E1 of the central control unit 15 may be present, for example, if a main power supply 21 of the autonomous operating driving system 9 fails and the central control unit 15 is not supplied with power. In order to prevent a failure of the entire autonomous vehicle system 5 in the event of a failure of the main power supply 21, the redundancy driving system 11 has a redundancy power supply 22 (see FIGS. 1 and 2), so that at least the redundancy driving system 11 remains ready for use. Due to the limited range of functions of the central redundancy control unit 19, it has a lower energy requirement compared to the central control unit 15, so that the redundancy power supply 22 can be smaller and/or more cost-effective than the main power supply 21. The main power supply 21 of the autonomous operating driving system 9, as illustrated by the dashed lines shown in FIG. 1, also supplies an operational controller 29 and a first group 41 of vehicle actuators 7.1, 7.2, 7.3. In an analogous manner, the redundancy driving system 11 comprises a redundancy controller 31 and a second group 53 of vehicle actuators 7.4, 7.5, which are supplied by the redundancy power supply 22.

The operational controller 29 is configured to monitor a fault status ES2 of the redundancy controller 31. In an analogous manner, the redundancy controller 31 is configured to monitor a fault status ES1 of the operational controller 29 (see FIGS. 3 and 4). The monitoring can preferably be carried out by sending a fault status ES1, ES2, by querying a fault status ES1, ES2 and/or by receiving a time out signal from the respective other controller 29, 31. Preferably, the operational controller 29 and/or the redundancy controller 31 is configured to provide the fault status ES2 of the redundancy controller 31 or the fault status ES1 of the operational controller 29 to the central control unit 15 and/or the redundancy control unit 19.

During fault-free operation, the central control unit 15 provides the operational trajectory TRB to the operational controller 29 and the redundancy controller 31. Furthermore, in parallel the redundancy control unit 19 provides the trajectory TR or the reduced trajectory TRR to the operational controller 29 and the redundancy controller 31. However, it may also be provided that the redundancy control unit 19 is configured to provide the trajectory TR or the reduced trajectory TRR only if a fault E1 of the central control unit 15 is determined. The operational controller 29 and the redundancy controller 31 are configured to use the trajectory TR or the reduced trajectory TRR only if no valid operational trajectory TRB is provided by the central control unit 15. For this purpose, the operational controller 29 and/or the redundancy controller 31 are preferably configured to carry out trajectory prioritization. Further, the central control unit 15 may also be configured to provide the operational trajectory TRB to the operational controller 29 and the redundancy controller 31 with a higher priority than a priority of the trajectory TR or reduced trajectory TRR provided by the redundancy control unit 19. Thus, it is preferably ensured that during fault-free operation the autonomous driving task FA is carried out using the operational trajectory TRB, and the trajectory TR and the reduced trajectory TRR are not taken into account for the performance of the autonomous driving task FA. If no operational trajectory TRB is provided by the central control unit 15 due to a fault of the autonomous operating driving system 9, the reduced driving task FAR is preferably carried out using the trajectory TR or the reduced trajectory TRR provided by the redundancy control unit 19.

The operational controller 29 is configured to control the first group 41 of vehicle actuators 7.1, 7.2, 7.3 in order to perform the autonomous driving task FA or the reduced driving task FAR. The operational controller 29 controls at least one of the vehicle actuators 7.1, 7.2, 7.3 of the first group 41 in such a way that the vehicle 2 is moved along the operational trajectory TRB, the trajectory TR or the reduced trajectory TRR. Preferably, the operational controller 29 is adapted to perform stability control for the vehicle 2 independently of the central control unit 15 to keep the vehicle 2 stable on the operational trajectory TRB, the trajectory TR or the reduced trajectory TRR. In an analogous manner, the redundancy controller 31 is configured to control the second group 53 of vehicle actuators 7.4, 7.5 in order to perform the autonomous driving task FA or the reduced driving task FAR. The redundancy controller controls at least one of the vehicle actuators 7.4, 7.5 of the second group 53 in such a way that the vehicle 2 is moved along the operational trajectory TRB, the trajectory TR or the reduced trajectory TRR. Preferably, the redundancy controller 31 is adapted to carry out stability control for the vehicle 2 independently of the redundancy control unit 19. Preferably, the operational controller 29 and the redundancy controller 31 work together for the stability control of the vehicle 2. It should be understood that during fault-free operation, both the vehicle actuators 7.1, 7.2, 7.3 of the first group 41 and the vehicle actuators 7.4, 7.5 of the second group 53 can be controlled to perform the autonomous driving task FA. The redundancy is ensured by the fact that in the event of a failure of the autonomous operating driving system 9, at least the second group 53 of vehicle actuators 7.4, 7.5 can be controlled in order to carry out the reduced driving task FAR. If there is only a fault E1 of the central control unit 15, the reduced driving task FAR can also be carried out by the operational controller 29 and/or the redundancy controller 31, wherein the trajectory TR or the reduced trajectory TRR is provided by the redundancy control unit 19 to the operational controller 29 and the redundancy controller 31. Preferably, the autonomous operating driving system 9 is also configured to perform the reduced driving task FAR if it is determined that there is a fault E2 of the redundancy driving system 11. This ensures that the reduced driving task FAR is carried out immediately after the detection of a fault E1, E2 of the autonomous operating driving system 9 or the redundancy driving system 11. Preferably, the central control unit 15 also provides the reduced trajectory TRR to the operational controller 29.

According to this embodiment, a fault status ES3 of the first group 41 of vehicle fuel actuators 7 can be determined by the operating controller 29 and particularly preferably provided to the central control unit 15 and/or the redundancy control unit 19. In an analogous manner, a fault status ES4 of the second group 53 of vehicle actuators 7 can be determined by the redundancy controller 31, and particularly preferably provided to the central control unit 15 and/or the redundancy control unit 19. Thus, the central control unit 15 can perform the operational trajectory planning and/or the trajectory planning using the fault status ES3 of the first group 41 of vehicle actuators 7. Preferably, the central control unit 15 is configured to decide whether the reduced driving task FAR or the autonomous driving task FA is carried out depending on the determined error status ES3 of the first group 41 of vehicle actuators 7 and/or the determined error status ES4 of the second group 53 of vehicle actuators 7. Also, the redundancy control unit 19 may preferably be adapted to take into account the fault status ES3 of the first group 41 and/or the fault status ES4 of the second group 53 of vehicle actuators 7 during the reduced trajectory planning.

According to the first embodiment (FIGS. 1, 2, 3), the first group of vehicle actuators 41 comprises a motor 7.1, a transmission 7.2 and a main braking system 7.3 of the vehicle 2. The second group of vehicle actuators 53 then preferably comprises a redundancy braking system 7.4 and a steering actuator 7.5. The redundancy braking system 7.4 is configured to enable deceleration of the vehicle 2 in the event of the failure of the main braking system 7.3. Preferably, a range of functions of the redundancy braking system 7.4 is reduced compared to the main braking system 7.3. This means that the redundancy braking system 7.4 can be implemented more cost-effectively. For example, an adjustment accuracy of the redundancy braking system 7.4 may be lower than a corresponding adjustment accuracy of the main braking system 7.3. Furthermore, the individual control of individual wheels 100.1, 100.2, 100.3, 100.4, 100.5, 100.6 of respective axles VA, HA1, HA2 may only be possible via the main braking system 7.3. Preferably, the main braking system 7.3 and the redundancy braking system 7.4 are connected in such a way that braking of the vehicle 2 can only be carried out with one of the braking systems 7.3, 7.4 at a time. For this purpose, it may be provided that the main braking system 7.3 and the redundancy braking system 7.4 are pneumatically interconnected in such a way that braking of the vehicle 2 via the redundancy braking system 7.4 is only possible if the main braking system 7.3 fails. According to the first embodiment of the autonomous vehicle system 5, the reduced driving task FAR is only carried out by the second group 53 of vehicle actuators if control of the first group 41 of vehicle actuators 7 is not possible due to a fault E1 of the operating driving system 9. Since braking via the main braking system 7.3 is not possible in such a case, the braking of the vehicle 2 is carried out via the redundancy braking system 7.4, while the vehicle 2 can be steered via the steering actuator 7.5.

According to a second embodiment (FIG. 4), the first group 41 of vehicle actuators 7 comprises the redundancy braking system 7.4 and the steering actuator 7.5. The second group 53 of vehicle actuators 7 then comprises the motor 7.1, the transmission 7.2 and the main braking system 7.3. With regard to the configuration of the main braking system 7.3 and the redundancy braking system 7.4, full reference is made to the above description of the first embodiment. If there is a fault E1 of the autonomous operating driving system 9 in an autonomous vehicle system 5 according to the second embodiment, the vehicle 2 can be braked via the main braking system 7.3. If it is not possible to control the steering actuator 7.5 due to a fault E1 of the operating driving system 9, emergency steering of the vehicle 2 can be carried out using the main braking system 7.3. In the case of emergency steering, individual wheels 100 of the vehicle 2, in particular front wheels 100.1, 100.2 of the front axle VA, are individually braked using the main braking system 7.3, so that the vehicle 2 can be kept in a lane 25. Also preferably, the main braking system 7.3 may be configured to enable a lane change and/or cornering of the vehicle 2 during emergency steering.

It should be understood that emergency steering within the scope of the reduced driving task only takes place if the steering actuator 7.5 cannot be controlled.

The autonomous driving system 5 according to a third embodiment (FIG. 5) is essentially analogous to the autonomous driving system 5 according to the first embodiment. The autonomous driving system 5 can be divided into classification levels: The primary sensors 13 and the redundancy sensors 17 are assigned to the "detect" classification level. The central control unit 15 and the redundancy control unit 19 belong to the "control" classification level, while the vehicle actuators 7 are assigned to the "activate" classification level. Furthermore, the "detect" classification level according to this embodiment comprises manual control devices 54, which enable the specification of a manual driving task FAM by a user. Manual control commands of a user are provided to the operational controller 29 and the redundancy controller 31, which are arranged between the "control" and "activate" classification levels and control the vehicle actuators 7 using the manual control commands.

The dashed line 83 emanating from the main braking system 7.3 illustrates the emergency steering in the event of a fault of the steering actuator 7.5, while the line 85 emanating from the redundancy braking system 7.4 indicates a deceleration of the vehicle via the redundancy braking system 7.4. Preferably, the autonomous vehicle system 5 also has a communication unit 51. This is assigned to the "connect" classification level and is configured to enable communication with other road users (not displayed) and/or objects in the vehicle environment 24 and/or with a central traffic control system (not shown). For example, the communication unit 51 can be used to receive information that describes a traffic volume on a planned route and is used by the central control unit 15 during the operational trajectory planning. Furthermore, via the communication unit 51, a warning signal can be sent to vehicles located in the vehicle environment 24 when the reduced driving task FAR is being carried out.

Figure 6:
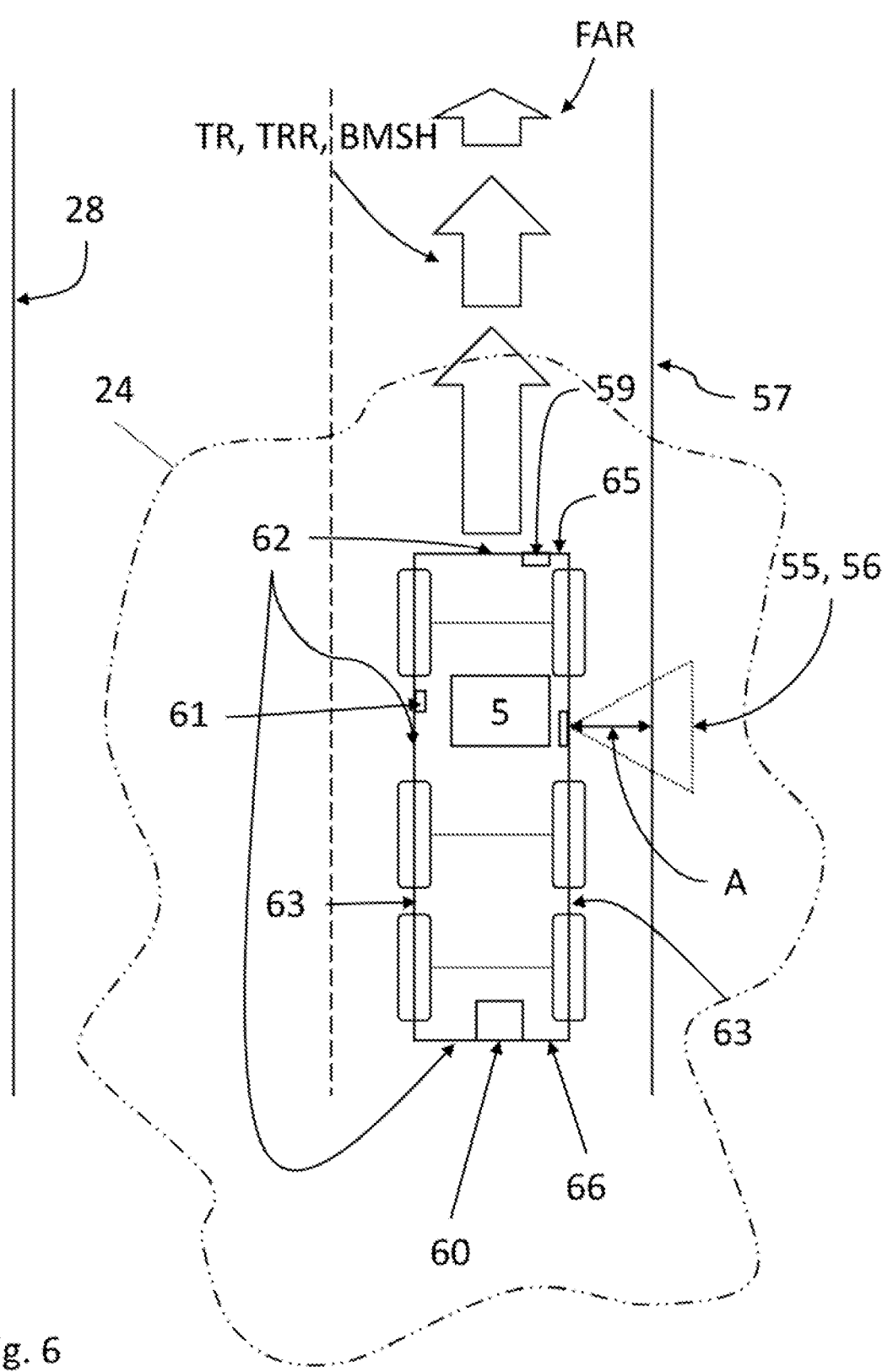
FIG. 6 shows a schematic representation of a vehicle with an autonomous vehicle system, wherein the vehicle is performing a lane-keeping braking maneuver.
Figure 7:
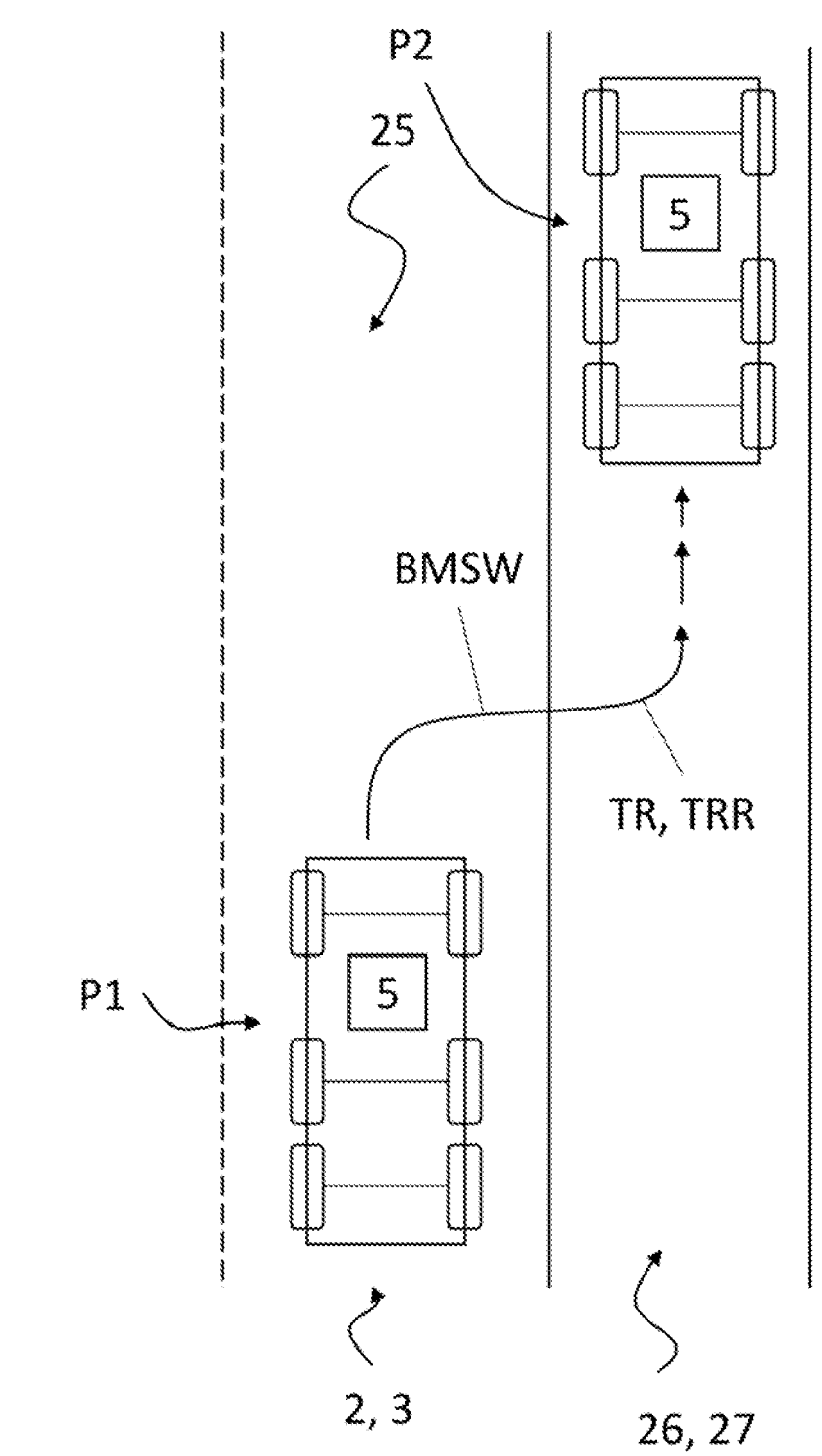
FIG. 7 shows a schematic representation of a vehicle with an autonomous vehicle system, wherein the vehicle is performing a lane change braking maneuver.

Preferably, the reduced driving task FAR is a lane-keeping braking maneuver BMSH illustrated in FIG. 6 or a lane change braking maneuver BMSW illustrated in FIG. 7. FIG.

6 shows a vehicle 2, which is in the form of a commercial vehicle 3 here, and which is moving along a lane 25 of a road 28. The road 28 does not have a shoulder 57 here. If a fault E1 of the autonomous operating driving system 9 is detected, the autonomous driving system 5 performs the reduced driving task FAR using the reduced trajectory TRR or the trajectory TR. Preferably, the central control unit 15 is configured to perform the lane-keeping braking maneuver BMSH if no alternative lane 26 is available. For example, the alternative lane 26 may not be available if there is only one lane 25, or if other existing lanes are not passable due to another vehicle or an obstacle. Preferably the redundancy driving system 11 is configured to perform the lane change braking maneuver BMSW. Preferably, the lane-keeping braking maneuver BMSH is therefore only carried out if the lane change braking maneuver MBSW is not possible or is not completely possible. As the arrows extending to the front, that is, upwards in FIG. 6, from a vehicle front 65 of the vehicle 2 indicate, the vehicle 2 is held in the lane 25 and decelerated to a standstill. According to this embodiment, the lane 25 is free in the direction of travel of the vehicle 2, so that a moderate deceleration of the vehicle 2 to a standstill is possible. It should be understood that the lane keeping braking maneuver BMSH can also be full braking of the vehicle 2. This is particularly the case if, due to an obstacle arranged in the lane 25, sufficient braking distance is not available for moderate deceleration of the vehicle 2.

The reduced driving task FAR, which is performed by the vehicle 2 shown in FIG. 7, which is in the form of a commercial vehicle 3 here, is a lane change braking maneuver BMSW. In a position P1 at the start of the trajectory, the vehicle 2 is located in the lane 25. At the end of the trajectory TR, the vehicle 2 is at a standstill on the shoulder 27. The deceleration of the vehicle 2 is illustrated by the decreasing length of the arrows representing the trajectory TR from position P1 to position P2 of the vehicle 2. It should be understood that the reduced driving task FAR can also be performed using the reduced trajectory TRR provided by the redundancy control unit 19. The lane change maneuver BMSW is carried out because the shoulder 27 is present and passable. It should be understood that the lane change braking maneuver BMSW may also include the lane change to an alternative lane 26, which is not a shoulder 27. Preferably, the lane change braking maneuver BMSW and/or the lane keeping braking maneuver BMSH may also include a short-term acceleration of the vehicle 2. More preferably, the reduced driving task FAR is carried out by the operating driving system 9 if a fault E2 of the redundancy driving system 11 is determined.

Figure 8:
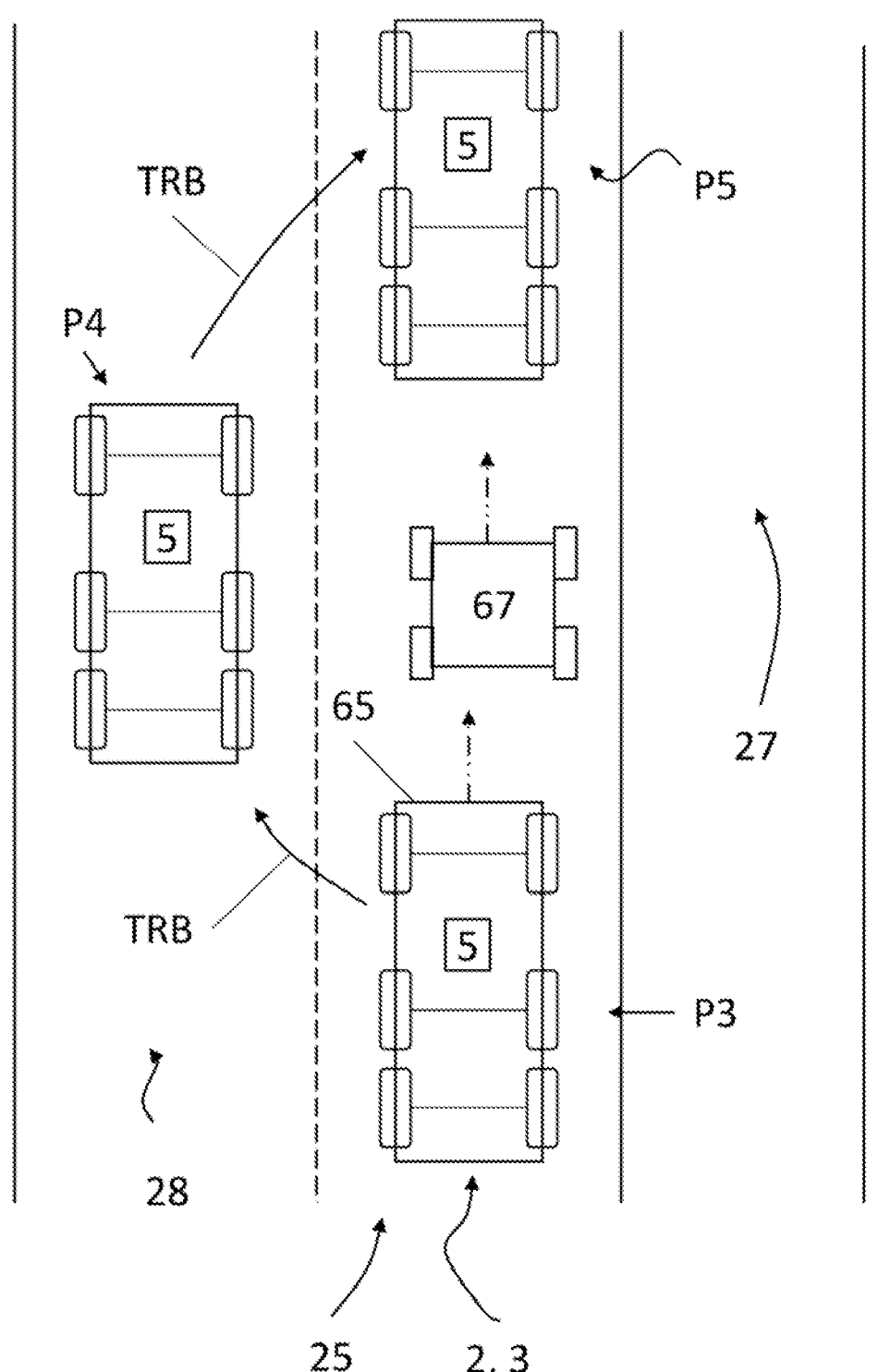
FIG. 8 shows a schematic representation of a vehicle with an autonomous vehicle system, where the vehicle is performing an autonomous driving task.

The autonomous driving task FA can consist of coping with a wide range of driving situations in normal road traffic or off-road. As an example of an autonomous driving task, an overtaking maneuver of the vehicle 2 is illustrated in FIG. 8. The autonomous vehicle system 5 controls the vehicle 2, which is shown here as a commercial vehicle 3, at a constant speed along the operational trajectory TRB from a third position P3 via a fourth position P4 to a fifth position P5. At the start of the autonomous driving task FA, the vehicle 2 drives at a constant speed in the lane 25. Using the sensor data SD of the primary sensors 13 and/or the redundancy sensor data SDR of the redundancy sensors 17, the central control unit 15 determines that a second vehicle 67 is moving at a lower speed than vehicle 2 in the lane 25, so that a distance between the front of the vehicle 65 and the second vehicle ahead 67 is reduced. Using the sensor data SD and/or the redundancy sensor data SDR, the central control unit 15 performs operational trajectory planning to obtain the operational trajectory TRB. The operational trajectory TRB is provided to the operational controller 29 and the redundancy controller 31. The operational controller 29 and/or the redundancy controller 31 control the vehicle actuators 7 in such a way that the vehicle 2 is steered to a free second lane 28. After the second vehicle 67 has been overtaken, the vehicle actuators 7 are controlled in such a way that the vehicle 2 is steered back to the lane 25. It should be understood that the autonomous operating driving system 9 monitors a vehicle environment 24 in order to be able to adapt the operational trajectory TRB if necessary.

In this embodiment (FIG. 6), the vehicle 2 has a side sensor 55, which is a side radar 56 here. Preferably, the side radar 56 is configured to determine a distance A between a lateral road boundary 57 and a lateral vehicle edge 63 and to provide it to the central control unit 15 and/or the redundancy control unit 19. It should be understood that the side sensor 55 can also provide only side sensor data SDSS, and that a determination of the distance A is then carried out by the central control unit 15 and/or the redundancy control unit 19. It may also be provided that the autonomous vehicle system 5 has multiple side sensors 55. Furthermore, the side sensor 55 may also be configured to detect whether there is a second vehicle 67, an obstacle and/or a non-passable section next to the vehicle 2. A non-passable section can be, for example, a road ditch or an embankment. Preferably, the central control unit 15 and/or the redundancy control unit 19 is configured to take into account vehicle parameters of the vehicle 2 for trajectory planning, operational trajectory planning and/or reduced trajectory planning. Vehicle parameters may be, for example, dimensions of the vehicle 2, the weight of the vehicle 2, the weight of a load of the vehicle 2 and/or the acceleration capacity of the vehicle 2. It should be understood that the vehicle parameters can include a variety of other parameters and are not fixed as the mentioned parameters. Preferably, the vehicle parameters are pre-stored in a memory 23 of the central control unit 15 and/or in a redundancy memory 33 of the redundancy control unit 19. However, it may also be provided that the central control unit 15 and/or the redundancy control unit 19 determines the driving parameters using vehicle parameter data provided to the central control unit 15 or the redundancy control unit 19.

Furthermore, the redundancy sensors 17 here include a short-range front radar 59, a short-range rear radar 60 and two wide-angle lidar sensors 61, wherein the wide-angle lidar sensors 61 are arranged on side edges of the vehicle 63. The short-range front radar 59 is arranged on the front of the vehicle 65, while the short-range rear radar 60 is arranged on a vehicle rear 66 of the vehicle 2. The short-range front radar 59, the short-range rear radar 60 and the wide-angle lidar sensors 61 are configured to monitor a vehicle environment 24, which is shown schematically here, up to the vehicle edges 62, which include the lateral vehicle edges 63, the front of the vehicle 65 and the rear of the vehicle 66. Furthermore, the redundancy sensors 17 may also include a height sensor (not shown), which is configured to determine a passable height of the vehicle environment 24. It should be understood that the primary sensors 13 can also be configured to monitor the vehicle environment 24 up to the vehicle front 65, to the vehicle rear 66 and to the side edges of the vehicle 63.

Figure 9:
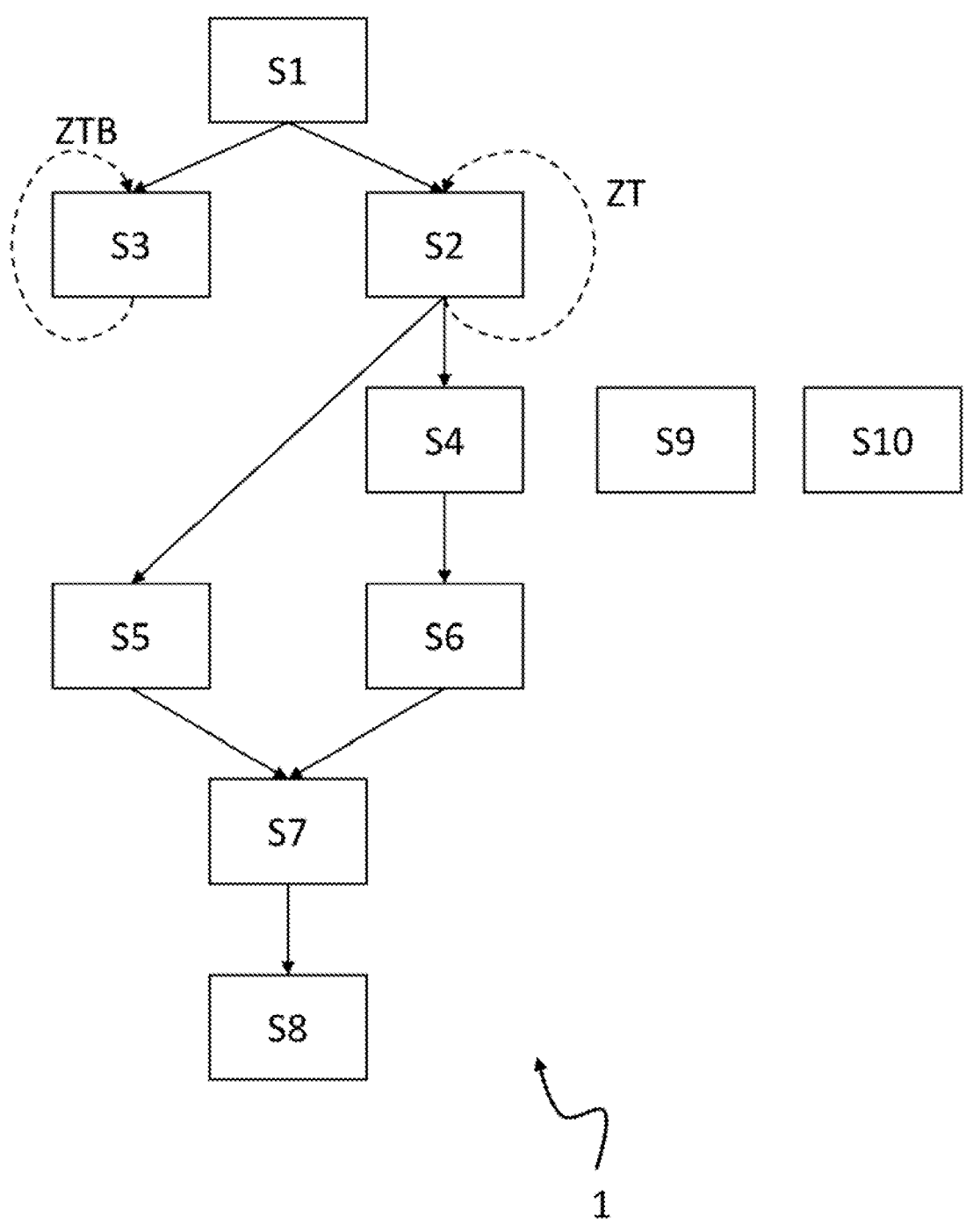
FIG. 9 shows a flowchart for a preferred embodiment of the method when there is no fault in the autonomous operating driving system; and, FIG. 10 shows a schematic flowchart for another preferred embodiment of the method when there is a fault of the autonomous operating driving system.

FIG. 9 illustrates a sequence of a preferred embodiment of the method 1 for controlling a vehicle 2 via an autonomous vehicle system 5. In a first step S1, primary sensors 13 and redundancy sensors 17 provide sensor data SD and redundancy sensor data SDR to the central control unit 15 of the autonomous operating driving system 9. Using the sensor data SD and the redundancy sensor data SDR, the central control unit 15 performs trajectory planning S2 and operational trajectory planning S3 to obtain a planned trajectory TR and an operational trajectory TRB. Here, the trajectory planning S2 and the operational trajectory planning S3 are repeated cyclically with the cycle time ZT and TZB respectively. In a step S4, the central control unit 15 provides the planned trajectory TR to the central redundancy control unit 19 of the redundancy driving system 11. Furthermore, the central control unit 15 provides both the planned trajectory TR and the operational trajectory TRB to the operational controller 29 and to the redundancy controller 31 (step S5). At the same time, in a step S6 the central redundancy control unit 19 provides the planned trajectory TR to the operational controller 29 and the redundancy controller 31. The operational controller 29 and the redundancy controller 31 determine in a step S7 that an operational trajectory TRB is provided and control vehicle actuators 7 to perform the autonomous driving task FA (step S8). It should be understood that the autonomous driving system 9 and the redundancy driving system 11 monitor in parallel to steps S1 to S8 whether there is a fault E1 of the operating driving system 9 (step S9) and/or whether there is a fault E2 of the redundancy driving system 11 (step S10).

Figure 10:
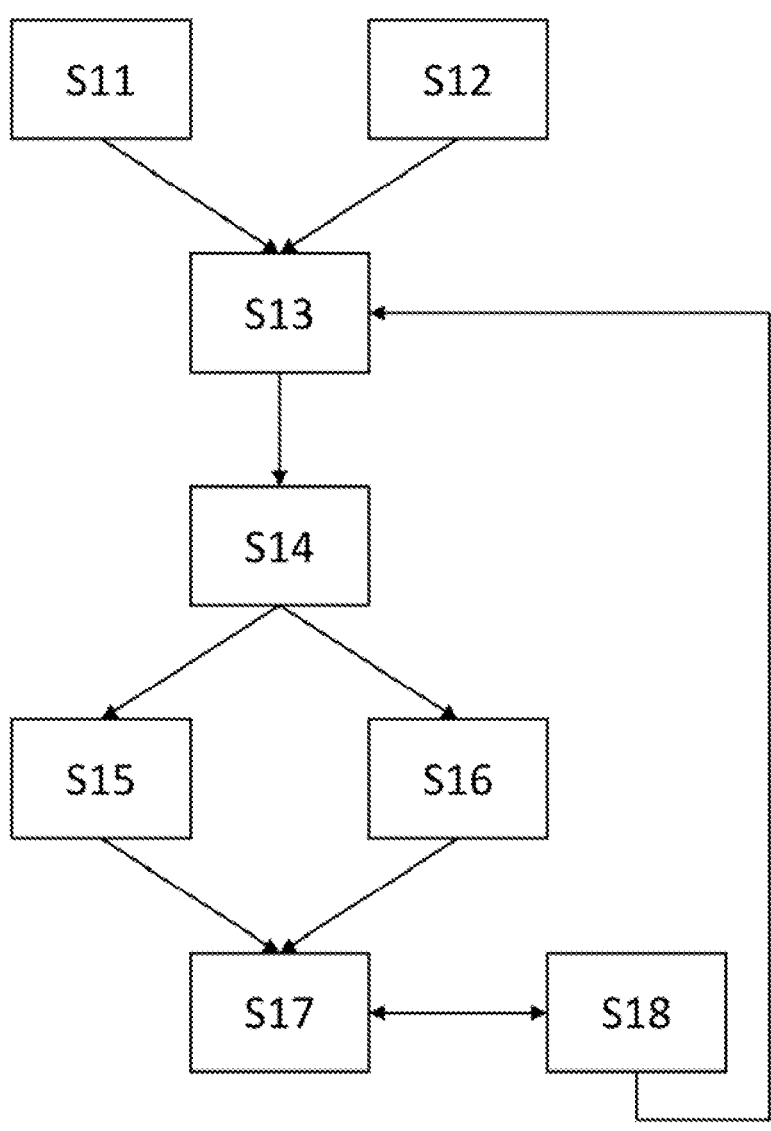
Figure 10:

FIG. 10 illustrates the sequence of a preferred embodiment of the method 1 if the operating driving system 9 fails due to a fault E1 and does not provide a trajectory TR. In the step S11, the redundancy driving system 11 determines that there is a fault E1 and no valid trajectory TR is provided by the central control unit 15. Using redundancy sensor data SDR provided by redundancy sensors 17 in step S12, in a step S13 the central redundancy control unit 19 performs reduced trajectory planning to obtain a reduced trajectory TRR for the reduced driving task FAR. The reduced trajectory TRR is then provided to the operational controller 29 and to the redundancy controller 31 (step S14). The redundancy controller 31 determines that the operating controller 29 has failed using the fault status ES1 of the operational controller 29. Furthermore, the redundancy controller 31 determines that there is no valid trajectory TR or operational trajectory TRB. It should be understood that the step S15 can also be carried out in parallel with or before the steps S11 to S14. The redundancy controller 31 then controls the second group 53 of vehicle actuators 7 in order to perform the reduced driving task FAR (step S17). In parallel with the execution of the reduced driving task FAR (step S17), the central redundancy control unit 19 monitors the vehicle environment 24 (step S18) via redundancy sensor data SDR provided by the redundancy sensors 17. If the impossibility of the reduced driving task FAR is determined, the reduced trajectory planning (step S13) is carried out again. The reduced driving task FAR becomes impossible, for example, if an obstacle is determined in the course of the reduced trajectory TRR.

It should be understood that the method 1 or the steps S1 to S18 of the method shown in FIGS. 9 and 10 are preferably repeated cyclically.

It is understood that the foregoing description is that of the preferred embodiments of the invention and that various changes and modifications may be made thereto without departing from the spirit and scope of the invention as defined in the appended claims.

REFERENCE CHARACTER LIST (PART
OF THE DESCRIPTION):

| | |
|---|---|
| 1 | Method |
| 2 | Vehicle |
| 3 | Commercial vehicle |
| 5 | Autonomous vehicle system |
| 7 | Vehicle actuators |
| 7.1 | Motor |
| 7.2 | Transmission |
| 7.3 | Main braking system |
| 7.4 | Redundancy braking system |
| 7.5 | Steering actuator |
| 9 | Operating driving system |
| 11 | Redundancy driving system |
| 13 | Primary sensors |
| 13.1 | First primary sensor |
| 13.2 | Second primary sensor |
| 13.3 | Third primary sensor |
| 15 | Central control unit |
| 17 | Redundancy sensors |
| 17.1 | First redundancy sensor |
| 17.2 | Second redundancy sensor |
| 19 | Central redundancy control unit |
| 21 | Main power supply |
| 22 | Redundancy power supply |
| 23 | Memory |
| 24 | Vehicle environment |
| 25 | Lane |
| 26 | Alternative lane |
| 27 | Shoulder |
| 28 | Second lane |
| 29 | Operational controller |
| 31 | Redundancy controller |
| 33 | Redundancy memory |
| 41 | First group of vehicle actuators |
| 53 | Second group of vehicle actuators |
| 54 | Manual control device |
| 55 | Side sensor |
| 56 | Side radar |
| 57 | Lateral road boundary |
| 59 | Short-range front radar |
| 60 | Short-range rear radar |
| 61 | Wide angle lidar sensor |
| 62 | Vehicle edges |
| 63 | Vehicle side edges |
| 65 | Vehicle front |
| 66 | Vehicle rear |
| 67 | Second vehicle |
| 83 | Dashed line |
| 85 | Dashed line |
| 100.1, 100.2 | Front wheels |
| 102.1, 102.2, 102.3, 102.4 | Rear wheels |
| A | Distance |
| BMSH | Lane keeping braking maneuver |
| BMSW | Lane change braking maneuver |
| ES1 | Operational controller fault status |
| ES2 | Redundancy controller fault status |
| ES3 | Fault status of the first group of vehicle actuators |
| ES4 | Fault status of the second group of vehicle actuators |
| AGO | Driving task |
| FAM | Manual driving task |
| FAR | Reduced driving task |
| HA1 | First rear axle |
| HA2 | Second rear axle |
| SD | Sensor |
| SDR | Redundancy sensor data |
| SDSS | Side sensor data |
| S1-S18 | Steps |
| TR | Trajectory |
| TRB | Operational trajectory |
| TRR | Reduced trajectory |
| VA | Front axle |
| ZT | Trajectory planning cycle time |
| ZTB | Operational trajectory planning cycle time |

What is claimed is:

1. A method for controlling a vehicle having an autonomous vehicle system configured to control the vehicle via multiple vehicle actuators, the vehicle system having an autonomous operating driving system configured to perform a dynamic driving task during fault-free operation of the autonomous operating driving system, wherein during fault-free operation the autonomous operating driving system is configured to control at least one of the multiple vehicle actuators for performing the dynamic driving task, the autonomous vehicle system further having a redundancy driving system configured to perform a reduced driving task, wherein the autonomous operating driving system is configured to carry out trajectory planning in order to provide a planned reduced trajectory for the reduced driving task in addition to an operational trajectory and a planned trajectory and to provide the planned reduced trajectory to the redundancy driving system, wherein the autonomous operating driving system and the redundancy driving system are mutually separate systems which are interconnected, wherein the redundancy driving system is configured to detect a first fault in the autonomous operating driving system and the autonomous operating driving system is configured to determine a second fault in the redundancy driving system, the method comprising:

controlling, via the redundancy driving system, at least one of the vehicle actuators in order to carry out the reduced driving task using the planned trajectory provided by autonomous vehicle system after detecting the first fault of the autonomous operating driving system;

wherein the autonomous operating driving system has one or more primary sensors configured to provide sensor data to a central control unit of the autonomous operating driving system, and, the central control unit performs the trajectory planning using the sensor data;

wherein, if there is no first fault, the central control unit carries out operational trajectory planning to obtain the operational trajectory, and provides the operational trajectory to an operational controller and a redundancy controller; and, at least one of the operational controller and the redundancy controller controls at least one of the vehicle actuators to keep the vehicle on the operational trajectory; and, wherein a central redundancy control unit provides the planned trajectory or the planned reduced trajectory of the reduced driving task to the operational controller and the redundancy controller; at least one of the operational controller and the redundancy controller controls at least one of the vehicle actuators to keep the vehicle on the planned reduced trajectory of the reduced driving task if there is no operational trajectory in the event of a fault of the autonomous operating driving system;

wherein the reduced trajectory, in comparison to the planned trajectory, has at least one of the following features:

using a reduced parameter set;

performing, based on at least one of qualitative and quantitatively reduced data; and, limiting with respect to at least one of a maximum length and maximum time duration, which the vehicle requires to drive the trajectory.

2. The method of claim 1, wherein the redundancy driving system is configured to carry out reduced trajectory planning to obtain a reduced trajectory for the reduced driving task if no valid planned trajectory is provided by the autonomous operating driving system; and, after determining the first fault of the autonomous operating driving system, the redundancy driving system controls at least one of the vehicle actuators to perform the reduced driving task using the reduced trajectory.

3. The method of claim 1, wherein the autonomous operating driving system carries out the trajectory planning cyclically to obtain the planned trajectory, and in each case provides the planned trajectory to the redundancy driving system.

4. The method of claim 1, wherein the redundancy driving system has one or more simple redundancy sensors which provide redundancy sensor data to a central redundancy control unit; the central redundancy control unit determines whether there is an obstacle on the planned trajectory or the planned reduced trajectory via the redundancy sensor data and modifies the operational trajectory or planned reduced trajectory using redundancy sensor data when an obstacle is detected on the planned trajectory or the reduced trajectory, wherein the redundancy sensor data is of lower quality than the sensor data of the primary sensors of the autonomous vehicle system.

5. The method of claim 4, wherein the redundancy driving system is supplied by a redundancy power supply independent of the operating driving system.

6. The method of claim 4, wherein the autonomous operating driving system has a central control unit; and, the redundancy sensors also provide the redundancy sensor data to the central control unit.

7. The method of claim 1, wherein the reduced driving task is a controlled braking maneuver in which the redundancy driving system prevents locking of the wheels of an axle of the vehicle.

8. The method of claim 7, wherein the redundancy driving system has one or more simple redundancy sensors which provide redundancy sensor data to a central redundancy control unit; the controlled braking maneuver is at least one of a lane-keeping braking maneuver in which the vehicle keeps to a lane and a lane change braking maneuver in which the vehicle is steered to an existing passable alternative lane and decelerated; and, wherein the central redundancy control unit monitors compliance with the planned trajectory or the planned reduced trajectory using the redundancy sensor data.

9. The method of claim 1, wherein the vehicle actuators include at least one of a transmission, a motor, a main braking system, a redundancy braking system, and a steering actuator.

10. The method of claim 1, wherein the operational controller monitors a fault status of the redundancy controller; and, the redundancy controller monitors a fault status of the operational controller.

11. The method of claim 1, wherein in the event that a main braking system of the autonomous operating driving system fails, the vehicle is braked via a redundancy braking system which is independent of a main power supply of the autonomous operating driving system.

12. The method of claim 11, wherein steering of the vehicle is carried out via a steering actuator, which is controlled by a redundancy controller and is independent of the main power supply of the autonomous operating driving system.

13. The method of claim 1, wherein in the event that a steering actuator of the operating driving system fails, emergency steering of the vehicle is carried out via a main braking system.

14. The method of claim 13, wherein the main braking system is controlled by a redundancy controller.

15. The method of claim 7, wherein the redundancy driving system has one or more simple redundancy sensors which provide redundancy sensor data to a central redundancy control unit; the controlled braking maneuver is at least one of a lane-keeping braking maneuver in which the vehicle keeps to a lane and a lane change braking maneuver in which the vehicle is steered to a shoulder and decelerated; and, wherein the central redundancy control unit monitors compliance with the planned trajectory or the planned reduced trajectory using the redundancy sensor data.

16. The method of claim 1, wherein the vehicle is a commercial vehicle.

17. An autonomous vehicle system for controlling a vehicle, the autonomous vehicle system comprising:

an autonomous operating driving system configured to control at least one vehicle actuator of the vehicle to perform a dynamic driving task during fault-free operation of said autonomous operating driving system;

a redundancy driving system configured to perform a reduced driving task;

said autonomous operating driving system being configured to carry out trajectory planning to obtain a planned reduced trajectory for the reduced driving task and to provide the planned reduced trajectory to said redundancy driving system;

said autonomous operating driving system and said redundancy driving system being mutually separate systems which are interconnected;

said redundancy driving system being configured to determine whether there is a first fault in said autonomous operating driving system;

said autonomous operating driving system being configured to determine whether there is a second fault in said redundancy driving system; and, said redundancy driving system being configured to control the at least one vehicle actuator to perform the reduced driving task on detecting the first fault of said autonomous operating driving system using said planned reduced trajectory;

wherein the autonomous operating driving system has at least one primary sensor for determining sensor data, a central control unit connected to said primary sensors, and a main power supply for the autonomous operating driving system; and, said central control unit is configured to carry out trajectory planning to obtain a planned trajectory using the sensor data if there is no first fault;

wherein, if there is no first fault, the central control unit carries out operational trajectory planning to obtain an operational trajectory, and provides the operational trajectory to an operational controller and a redundancy controller; and, at least one of the operational controller and the redundancy controller controls at least one of the vehicle actuators to keep the vehicle on the operational trajectory;

wherein a central redundancy control unit provides the planned trajectory or the planned reduced trajectory of the reduced driving task to the operational controller and the redundancy controller; at least one of the operational controller and the redundancy controller controls at least one of the vehicle actuators to keep the vehicle on the planned reduced trajectory of the reduced driving task if there is no operational trajectory in the event of a fault of the operating driving system;

wherein the reduced trajectory, in comparison to the planned trajectory, has at least one of the following features:

using a reduced parameter set;

performing, based on at least one of qualitative and quantitatively reduced data; and, limiting with respect to at least one of a maximum length and maximum time duration, which the vehicle requires to drive the trajectory.

18. The autonomous vehicle system of claim 17, wherein said redundancy driving system is configured to carry out reduced trajectory planning to obtain a reduced trajectory for the reduced driving task if no valid planned trajectory is provided by said autonomous operating driving system; and, said redundancy driving system is configured to control the at least one vehicle actuator to perform said reduced driving task on detecting the first fault of said autonomous operating driving system using said reduced trajectory.

19. The autonomous vehicle system of claim 17, wherein said autonomous operating driving system further has an operational controller connected to said central control unit; and, said operational controller is configured to control at least one of the at least one vehicle actuator and a first group of vehicle actuators of the vehicle system.

20. The autonomous vehicle system of claim 19, wherein said first group of vehicle actuators includes at least one of a transmission, a motor, and a main braking system connected to said main power supply of said autonomous operating driving system.

21. The autonomous vehicle system of claim 19, wherein said first group of vehicle actuators further includes at least one of a steering actuator and a redundancy braking system connected to said main power supply of said autonomous operating driving system.

22. The autonomous vehicle system of claim 17, wherein said redundancy driving system has at least one simple redundancy sensor for determining redundancy sensor data which are connected to said central control unit of said autonomous operating driving system and to a central redundancy control unit of said redundancy driving system.

23. The autonomous vehicle system of claim 22, wherein said redundancy driving system further has a redundancy power supply for supplying the redundancy driving system and a redundancy controller configured to control at least one of the at least one vehicle actuator and a second group of vehicle actuators of the vehicle system.

24. The autonomous vehicle system of claim 23, wherein the second group of vehicle actuators includes at least one of a steering actuator and a redundancy braking system which are connected to said redundancy power supply of said redundancy driving system.

25. The autonomous vehicle system of claim 23, wherein said second group of vehicle actuators includes at least one of a transmission, a motor, and a main braking system which are connected to said redundancy power supply of said redundancy driving system.

26. The autonomous vehicle system of claim 22, wherein said at least one simple redundancy sensor includes at least one of a vehicle side sensor, a side radar, a side ultrasound, and a side lidar sensor, which is configured to determine a distance (A) to a lateral road boundary.

27. The autonomous vehicle system of claim 22, wherein the vehicle has a plurality of vehicle edges; and, said at least one simple redundancy sensor includes at least one of a short-range front radar and a wide angle lidar sensor, which are configured to determine a passable space up to the vehicle edges.

28. The autonomous vehicle system of claim 19, wherein said operational controller is configured to determine a third fault status of said first group of vehicle actuators and to provide said third fault status to said central control unit.

29. The autonomous vehicle system of claim 23, wherein said redundancy controller is configured to determine a fourth fault status of said second group of vehicle actuators and to provide said fourth fault status to at least one of said central redundancy control unit and said central control unit.

30. A vehicle comprising:

an autonomous vehicle system for controlling the vehicle;

said autonomous vehicle system including an autonomous operating driving system and a redundancy driving system;

said autonomous operating driving system being configured to control at least one vehicle actuator of the vehicle to perform a dynamic driving task during fault-free operation of said autonomous operating driving system;

said redundancy driving system being configured to perform a reduced driving task;

said autonomous operating driving system being configured to carry out trajectory planning to obtain a planned reduced trajectory for the reduced driving task and to provide the planned reduced trajectory to said redundancy driving system;

said autonomous operating driving system and said redundancy driving system being mutually separate systems which are interconnected;

said redundancy driving system being configured to determine whether there is a first fault in said autonomous operating driving system;

said autonomous operating driving system being configured to determine whether there is a second fault in said redundancy driving system;

said redundancy driving system being configured to control the at least one vehicle actuator to perform the reduced driving task on detecting the first fault of said autonomous operating driving system using said planned reduced trajectory; and, wherein said autonomous vehicle system is configured to:

control, via said redundancy driving system, said at least one vehicle actuator in order to carry out the reduced driving task using the planned reduced trajectory after detecting the first fault of said autonomous operating driving system;

wherein said autonomous operating driving system has one or more primary sensors configured to provide sensor data to a central control unit of said autonomous operating driving system; and, said central control unit performs the trajectory planning using the sensor data;

wherein, if there is no first fault, said central control unit carries out operational trajectory planning to obtain an operational trajectory, and provides the operational trajectory to an operational controller and a redundancy controller; and, at least one of said operational controller and said redundancy controller controls said at least one vehicle actuator to keep the vehicle on the operational trajectory; and, wherein a central redundancy control unit provides the planned reduced trajectory of the reduced driving task to said operational controller and said redundancy controller; at least one of said operational controller and said redundancy controller controls said at least one vehicle actuator to keep the vehicle on the planned reduced trajectory of the reduced driving task if there is no operational trajectory in the event of a fault of said autonomous operating driving system;

wherein the reduced trajectory, in comparison to the planned trajectory, has at least one of the following features:

using a reduced parameter set;

performing, based on at least one of qualitative and quantitatively reduced data; and, limiting with respect to at least one of a maximum length and maximum time duration, which the vehicle requires to drive the trajectory.

31. The vehicle of claim 30, wherein the vehicle is a commercial vehicle.

32. The method of claim 1, wherein the reduced driving task has a reduced range of functions relative to the dynamic driving task.

33. The method of claim 1, wherein the central control unit is powered by a main power supply and the redundancy driving system is supplied with power by a redundancy power supply which is separate from the main power supply.

34. The autonomous vehicle system of claim 17, wherein the vehicle has a first group of actuators and a second group of actuators; said autonomous driving system being configured to control said first group of actuators; said redundancy driving system being configured to control said second group of actuators; wherein said first group of actuators and said second group of actuators are separate groups of actuators.

35. The method of claim 1, wherein the vehicle further has a communication unit configured to receive information about a traffic volume on a planned route, and wherein said received information is used by the central control unit during said operational trajectory planning.

36. The vehicle of claim 30, further comprising a communication unit configured to receive information about a traffic volume on a planned route, wherein said received information is used by the central control unit during said operational trajectory planning.

\* \* \* \* \*